United States Patent
Peng et al.

(10) Patent No.: US 11,614,643 B2
(45) Date of Patent: Mar. 28, 2023

(54) HIGH-SPEED WAVELENGTH-SCALE SPATIAL LIGHT MODULATORS WITH TWO- DIMENSIONAL TUNABLE MICROCAVITY ARRAYS

(71) Applicant: Massachusetts Institute of Technology, Cambridge, MA (US)

(72) Inventors: Cheng Peng, Beijing (CN); Christopher Louis Panuski, Somerville, MA (US); Ryan Hamerly, Cambridge, MA (US); Dirk Robert Englund, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 228 days.

(21) Appl. No.: 16/876,477

(22) Filed: May 18, 2020

(65) Prior Publication Data
US 2021/0018767 A1    Jan. 21, 2021

Related U.S. Application Data

(60) Provisional application No. 62/874,776, filed on Jul. 16, 2019.

(51) Int. Cl.
*G02F 1/017*    (2006.01)
*B82Y 20/00*    (2011.01)
(Continued)

(52) U.S. Cl.
CPC ............... *G02F 1/03* (2013.01); *B82Y 20/00* (2013.01); *G01J 3/26* (2013.01); *G02B 6/0016* (2013.01);
(Continued)

(58) Field of Classification Search
CPC ... G02F 1/03; G02F 1/01; G02F 1/017; G02F 1/01708; G02F 1/01716; G02F 1/035;
(Continued)

(56) References Cited

U.S. PATENT DOCUMENTS 5,157,538 A   10/1992 Soref
5,488,504 A   1/1996 Worchesky et al.
(Continued)

OTHER PUBLICATIONS

Abel et al., "A hybrid barium titanate-silicon photonics platform for ultraefficient electro-optic tuning." Journal of Lightwave Technology 34.8 (2016): 1688-1693.
(Continued)

*Primary Examiner* — Jie Lei
(74) *Attorney, Agent, or Firm* — Smith Baluch LLP

(57) ABSTRACT

A reflective spatial light modulator (SLM) made of an electro-optic material in a one-sided Fabry-Perot resonator can provide phase and/or amplitude modulation with fine spatial resolution at speeds over a Gigahertz. The light is confined laterally within the electro-optic material/resonator layer stack with microlenses, index perturbations, or by patterning the layer stack into a two-dimensional (2D) array of vertically oriented micropillars. Alternatively, a photonic crystal guided mode resonator can vertically and laterally confine the resonant mode. In phase-only modulation mode, each SLM pixel can produce a π phase shift under a bias voltage below 10 V, while maintaining nearly constant reflection amplitude. This high-speed SLM can be used in a wide range of new applications, from fully tunable metasurfaces to optical computing accelerators, high-speed interconnects, true 2D phased array beam steering, beam forming, or quantum computing with cold atom arrays.

21 Claims, 25 Drawing Sheets

(51) Int. Cl.
    G02F 1/21      (2006.01)
    G01J 3/26      (2006.01)
    F21V 8/00      (2006.01)
    G02F 1/03      (2006.01)
(52) U.S. Cl.
    CPC ............ G02F 1/01708 (2013.01); G02F 1/21 (2013.01); *G02F 2202/32* (2013.01); *G02F 2203/12* (2013.01); *G02F 2203/50* (2013.01)
(58) Field of Classification Search
    CPC . G02F 1/212; G02F 1/225; G02F 1/21; G02F 1/213; G02F 1/218; G02F 2202/32; G02F 2203/12; G02F 2203/50; G02B 6/0016; G02B 5/00; G02B 26/001; G02B 26/06; G02B 5/281; G02B 5/284; B82Y 20/00; G01J 3/26
    USPC ....... 359/247, 237, 245, 248, 260, 261, 263, 359/315–318
    See application file for complete search history.

(56)            References Cited

U.S. PATENT DOCUMENTS

| | | | |
|---|---|---|---|
| 5,835,517 | A | 11/1998 | Jayaraman et al. |
| 6,404,538 | B1 | 6/2002 | Chen et al. |
| 6,819,463 | B2 | 11/2004 | Noonan |
| 2003/0223699 | A1 | 12/2003 | Kimerling et al. |
| 2018/0046056 | A1* | 2/2018 | Na .................... H04B 10/80 |
| 2018/0081204 | A1 | 3/2018 | Ma et al. |

OTHER PUBLICATIONS

Abel et al., "A strong electro-optically active lead-free ferroelectric integrated on silicon." Nature Communications 4 (2013): 1671. 6 pages.

Abel et al., "Large Pockels effect in micro- and nanostructured barium titanate integrated on silicon." Nature Materials 18.1 (2019): 42. 33 pages.

Abel, Electro-optic photonic devices based on epitaxial barium titanate thin films on silicon. Diss. Université de Grenoble, 2014. 243 pages.

Barbier et al., "Spatial light modulators: processing light in real time." Optics and Photonics News 8.3 (1997): 16-21.

Bernien et al., "Probing many-body dynamics on a 51-atom quantum simulator." Nature 551.7682 (2017): 579.

Chung et al., "Transverse-mode-selectable microlens vertical-cavity surface-emitting laser." Optics Express 18.5 (2010): 4138-4147.

Ding et al., "Vertical microcavities with high Q and strong lateral mode confinement." Physical Review B 87.16 (2013): 161116. 5 pages.

Dudley et al., "Emerging digital micromirror device (DMD) applications." MOEMS display and imaging systems. vol. 4985. International Society for Optics and Photonics, 2003. 13 pages.

Electro-optic and photorefractive materials, Springer proceedings in physics 18. Edited by P. Gunter. IEEE Journal of Quantum Electronics 23.12 (1987). 395 pages.

Eltes et al., "A BaTiO 3-Based electro-optic pockels modulator monolithically integrated on an advanced silicon photonics platform." Journal of Lightwave Technology 37.5 (2019): 1456-1462.

Eltes et al., "A novel 25 Gbps electro-optic Pockels modulator integrated on an advanced Si photonic platform." 2017 IEEE International Electron Devices Meeting (IEDM). IEEE, 2017. 601-604.

Eltes et al., "Low-loss BaTiO3—Si waveguides for nonlinear integrated photonics." ACS Photonics 3.9 (2016): 1698-1703.

Fattal et al., "Flat dielectric grating reflectors with focusing abilities." Nature Photonics 4.7 (2010): 466-470.

Fienup, "Phase retrieval algorithms: a comparison." Applied Optics 21.15 (1982): 2758-2769.

Hamerly et al. "Large-scale optical neural networks based on photoelectric multiplication." Physical Review X 9.2 (2019): 021032. 12 pages.

Haus, Waves and fields in optoelectronics. Prentice-Hall, 1984. 208 pages.

Henderson et al., "Free space adaptive optical interconnect at 1.25 GB/s, with beam steering using a ferroelectric liquid-crystal SLM." Journal of Lightwave Technology 24.5 (2006): 1989-1997.

Horie et al., "High-speed, phase-dominant spatial light modulation with silicon-based active resonant antennas." ACS Photonics 5.5 (2017): 1711-1717.

Huang et al., "Gate-tunable conducting oxide metasurfaces." Nano Letters 16.9 (2016): 5319-5325.

International Search Report and Written Opinion in International Patent Application No. PCT/US2020/033372 dated Aug. 14, 2020, 10 pages.

Kahn et al., "Communications expands its space." Nature Photonics 11.1 (2017): 5.4 pages.

Kuo et al., "Strong quantum-confined Stark effect in germanium quantum-well structures on silicon." Nature 437.7063 (2005): 1334. 3 pages.

Mai et al., "Integrated vertical microcavity using a nano-scale deformation for strong lateral confinement." Applied Physics Letters 103.24 (2013): 235_1. 5 pages.

Messner et al., "Plasmonic ferroelectric modulators." Journal of Lightwave Technology 37.2 (2018): 281-290.

Ortmann et al., "Ultra-Low-Power Tuning in Hybrid Barium Titanate-Silicon Nitride Electro-optic Devices on Silicon." ACS Photonics 6.11 (2019): 2677-2684.

Peng et al., "High-Speed Phase-Only Spatial Light Modulators with Two-Dimensional Tunable Microcavity Arrays." arXiv preprint arXiv:1908.06495 (2019). 12 pages.

Photonic devices. IBM Research Zurich. Accessed at https://www.zurich.ibm.com/st/photonics/devices.html on Jul. 16, 2019. 6 pages.

Pierangeli et al., "Large-scale photonic Ising machine by spatial light modulation." Physical Review Letters 122.21 (2019): 213902. 6 pages.

Pitruzzello et al., "Photonic crystal resonances for sensing and imaging." Journal of Optics 20.7 (2018): 073004. 24 pages.

Polyanskiy, Refractive index database. Accessed at https://refractiveindex.info on Aug. 18, 2020. 3 pages.

Shrauger et al., "Development of a high-speed high-fill-factor phase-only spatial light modulator." Diffractive and Holographic Technologies for Integrated Photonic Systems. vol. 4291. International Society for Optics and Photonics, 2001. 9 pages.

Shuai et al., "Coupled bilayer photonic crystal slab electro-optic spatial light modulators." IEEE Photonics Journal 9.2 (2017): 1-11.

Suh et al., "All-pass transmission or flattop reflection filters using a single photonic crystal slab." Applied Physics Letters 84.24 (2004): 4905-4907.

Triggs et al., "Spatial resolution and refractive index contrast of resonant photonic crystal surfaces for biosensing." IEEE Photonics Journal 7.3 (2015): 1-10.

Van Spengen, "MEMS reliability from a failure mechanisms perspective." Microelectronics Reliability 43.7 (2003): 1049-1060.

Winkler et al., "High quality factor GaAs microcavity with buried bullseye defects." Physical Review Materials 2.5 (2018): 052201. 6 pages.

Zhang et al., "Fundamentals of phase-only liquid crystal on silicon (LCOS) devices." Light: Science & Applications 3.10 (2014): e213. 10 pages.

Zhang et al., "Submicrometer diameter micropillar cavities with high quality factor and ultrasmall mode volume." Optics Letters 34.7 (2009): 902-904.

* cited by examiner

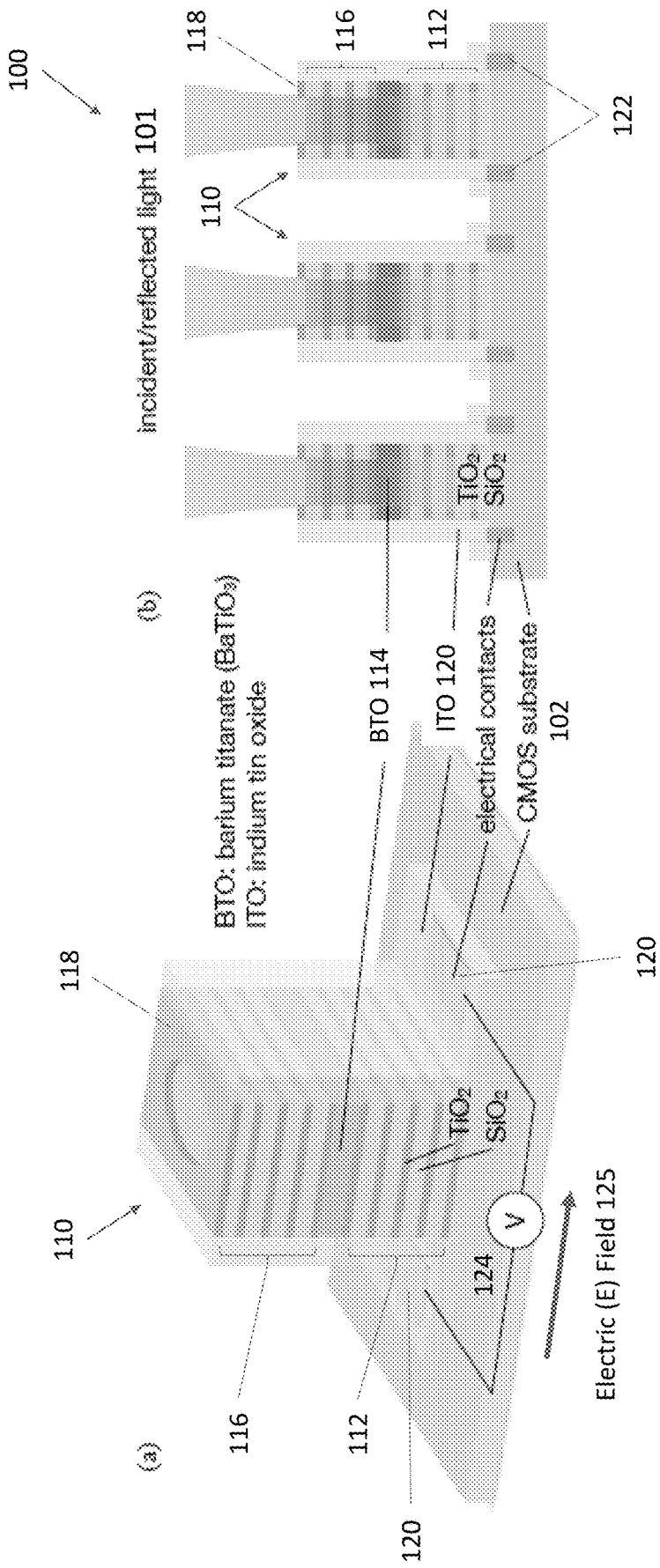

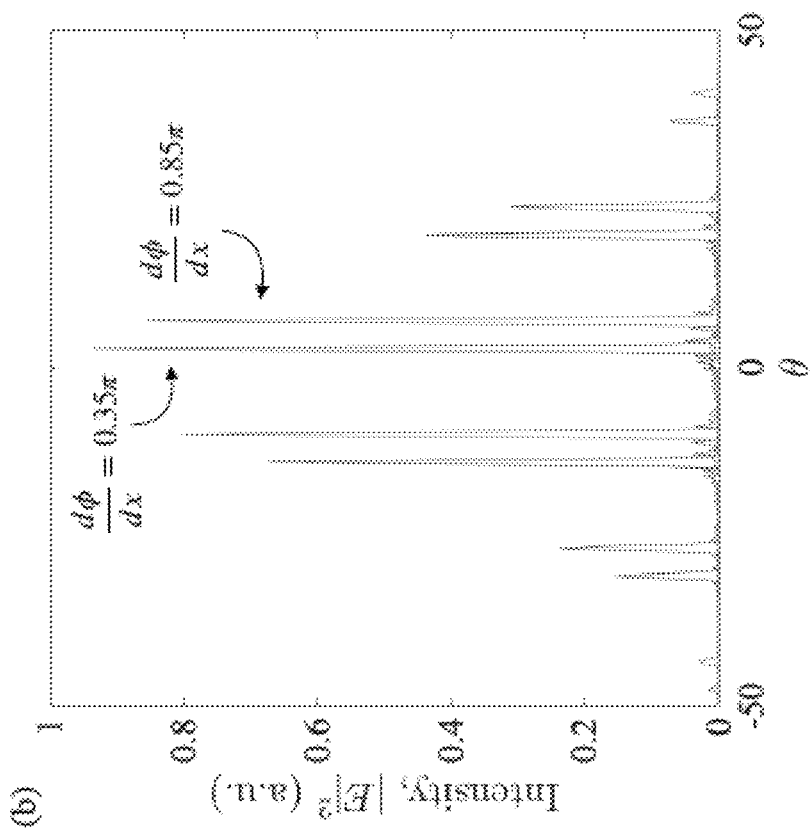
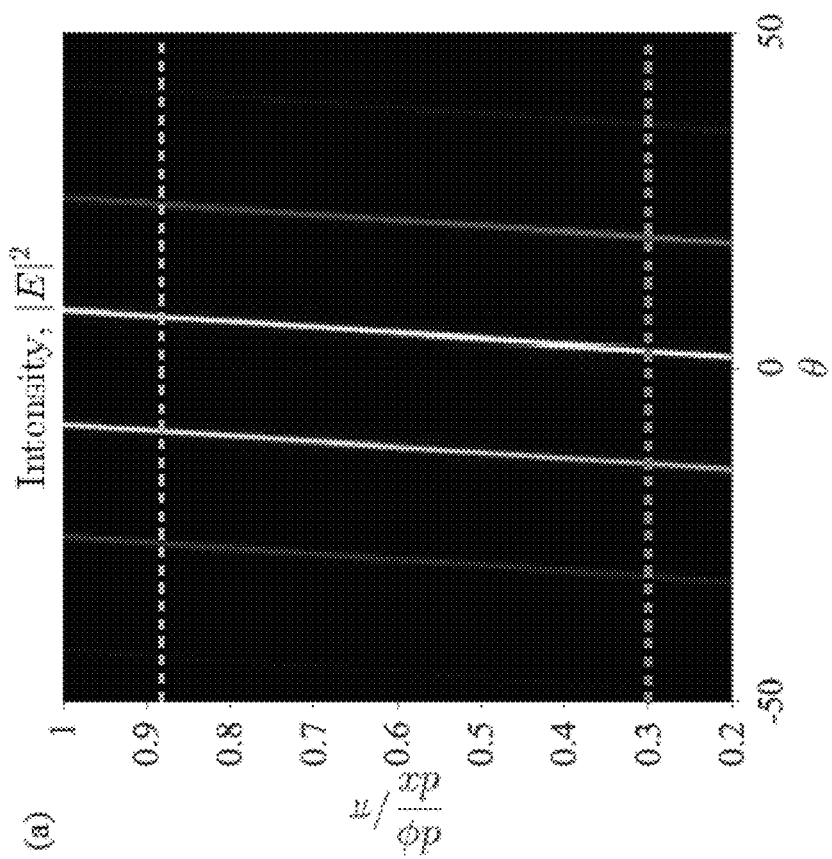
FIG. 6A
FIG. 6B

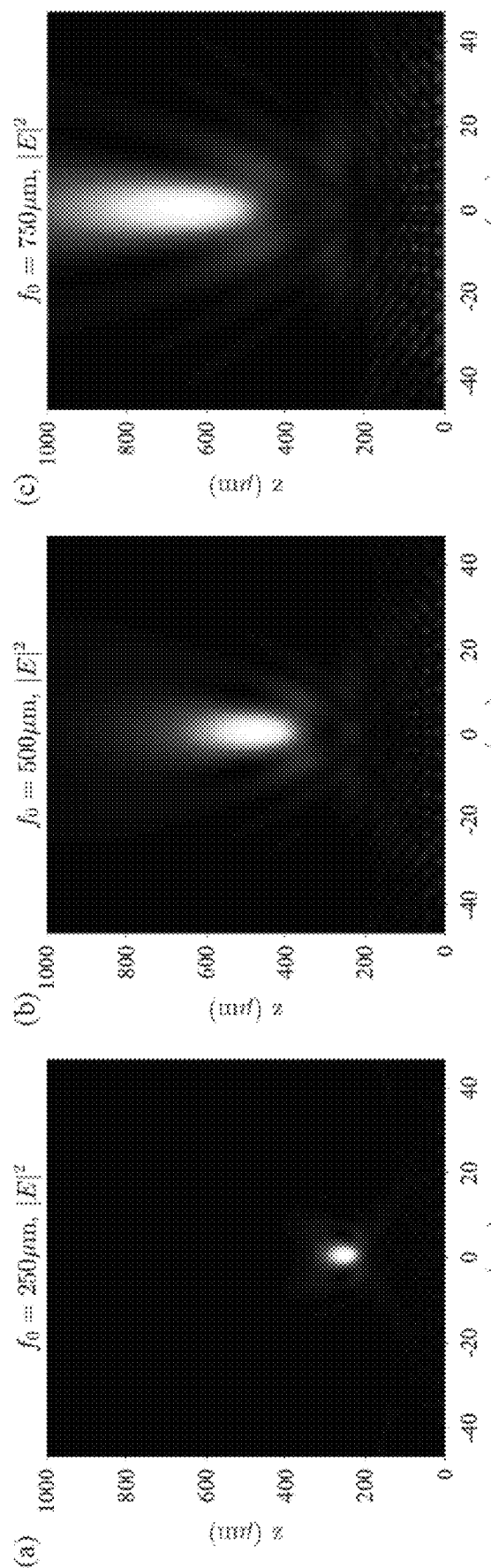

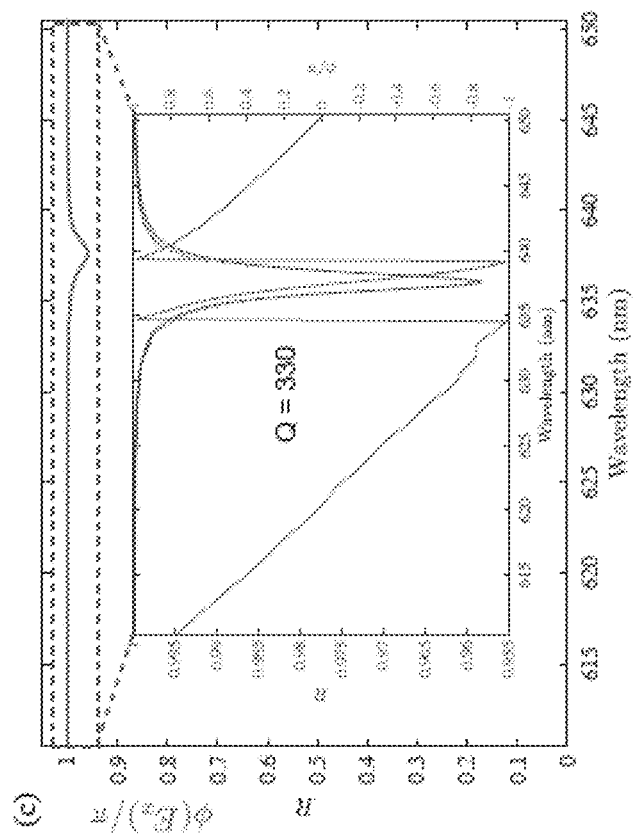
*FIG. 12A*
*FIG. 12C*
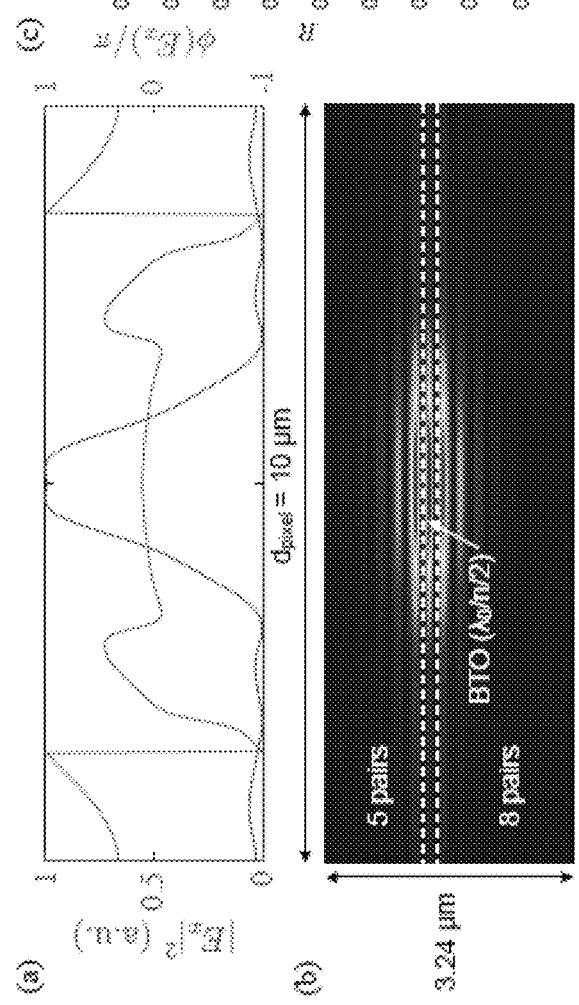
*FIG. 12B*

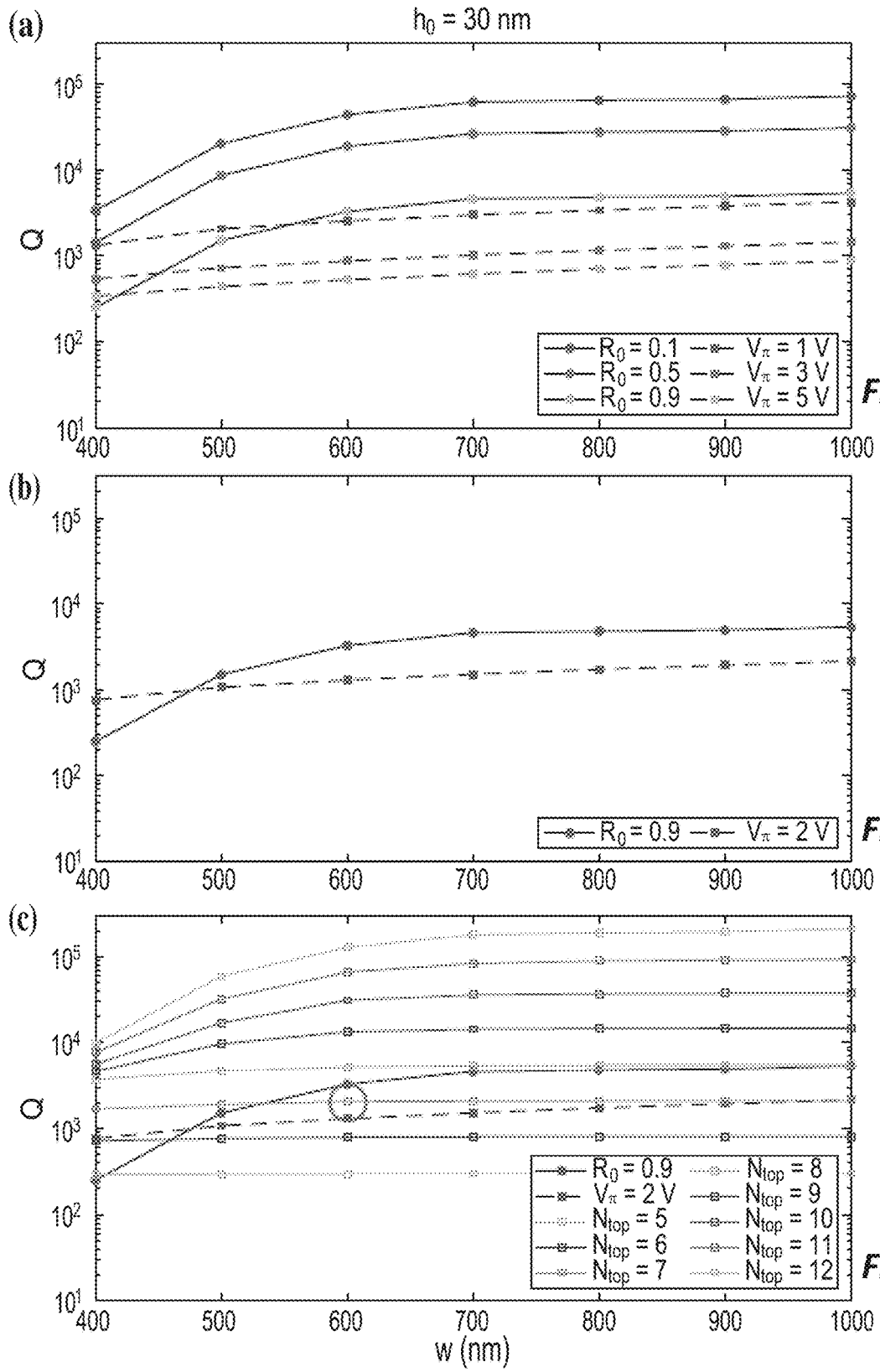

HIGH-SPEED WAVELENGTH-SCALE SPATIAL LIGHT MODULATORS WITH TWO-DIMENSIONAL TUNABLE MICROCAVITY ARRAYS

CROSS-REFERENCE TO RELATED APPLICATION(S)

This application claims the priority benefit, under 35 U.S.C. § 119(e), of U.S. Application No. 62/874,776, which was filed on Jul. 16, 2019, and is incorporated herein by reference in its entirety.

GOVERNMENT SUPPORT

This invention was made with Government support under Grant No. W911NF-17-1-0435 awarded by the Army Research Office (ARO). The Government has certain rights in the invention.

BACKGROUND

Spatial light modulators (SLMs), which manipulate the spatial amplitude and phase distributions of light waves, find applications in a wide range of applications including compact beam steering for LiDAR, beam shaping, biomedical in vivo imaging through scattering media, wave front encoding for optical information processing, and fast programmable optical tweezers. Current commercial technologies for SLMs include liquid crystal on silicon (LCOS) and digital micromirror devices (DMDs). The slow response time of liquid crystals (LCs) limits the refresh rate of LCOS SLMs to about 10 kHz. Micro-electromechanical systems (MEMS)-based DMDs are faster, with response times of tens of microseconds. However, DMDs have a complex design and manufacturing process and a relatively high failure rate due to their moving parts, making them less suitable for mass production.

To realize high-speed (e.g., GHz), high fill-factor SLMs, several emerging SLM platforms are currently under research, including free-carrier dispersion effect modulation in silicon, epsilon-near-zero material indium tin oxide (ITO), and quantum-confined Stark effect in semiconductors. However, to achieve high efficiency for applications such as high-speed display and beam steering, phase-only modulation is necessary. To date, all high-speed SLM architectures have coupled phase and amplitude modulation. A high-speed, phase-only SLM design is called for.

SUMMARY

Here, we disclose SLMs with one or more vertically-oriented one-sided microcavities whose resonance frequencies are modulated through a linear electro-optic (EO) material, or Pockels material, embedded in the microcavities. The Pockels effect shifts the refractive index of the EO material according to $$\Delta\left(\frac{1}{n^2}\right)_i = \sum_{j=1}^{3} r_{ij} E_j \quad (1)$$

where $r_{ij}$ is the electro-optic tensor. The Pockels effect has two properties that enable high-speed, phase-only modulation. First, only the real part of the refractive index is modified, enabling phase-only modulation. Second, the Pockels effect (in ferroelectric oxides) has an ultrafast response timescale in the femtosecond range.

The Pockels effect is relatively weak, so it is difficult to achieve a phase change of π in reflection under voltages below about 10 V. One choice of EO material that mitigates this problem is barium titanate ($BaTiO_3$, also known as BTO). BTO is an excellent material for electro-optic modulators due to its high electro-optic coefficients, which have been measured to be as large as $r_{42}$=923 pm/V. Electro-optic modulation in BTO has sub-picosecond response times. (A Si-integrated BTO electro-optic modulator was recently demonstrated for high speed operation up 65 GHz.) BTO is chemically and thermally stable and it can be grown epitaxially over standard silicon and silicon-on-insulator (SOI) wafers. But even for a high electric field of about 10 V/μm, reflection through a layer thickness h of BTO yields a phase modulation change of only $\Delta\phi=(2\pi/\lambda)\Delta n(2h)\approx 0.15\pi$ for a 1 μm film.

In the inventive SLMs, the phase change is amplified by placing the BTO in one-sided microcavities. The light is confined laterally within the SLMs by patterning the microcavity into separate micro pillars or by using integrated microlenses or index perturbations (defects) to concentrate the field transversely. Alternatively, the light can be confined vertically and laterally within the BTO layer using a guided mode resonance in a photonic crystal layer on the BTO layer. Regardless of the confinement mechanism, the BTO is modulated electro-optically with an electric field in the same plane as the BTO's crystalline c axis. This plane is perpendicular to the SLM's optical axis.

An inventive SLM may include an array of phase shifters, each of which includes a Fabry-Perot resonator, a layer of electro-optic material in a cavity of the Fabry-Perot resonator, and a pair of electrodes in electrical communication with the layer of electro-optic material. In operation, the Fabry-Perot resonator reflects incident light in a first direction. The layer of electro-optic material shifts a phase of the incident light reflected by the Fabry-Perot resonator. And the electrodes generates an electric field in a second direction orthogonal to the first direction. This electric field modulates a real part of a refractive index of the electro-optic material.

Depending on the Fabry-Perot resonator's reflection cavity, the SLM can modulate the phase of the incident light independently of an amplitude of the incident light.

The phase shifters may have a pitch of about 5 μm and widths equal to or less than about 5 μm. Each phase shifter can have a half-wave voltage $V_\pi$ of less than about 10 Volts and can shift the phase of the incident light over a range from 0 radians to 2π radians. In some cases, the phase shifters can be patterned as individual micropillars or microposts.

The Fabry-Perot resonator may be an asymmetric Fabry-Perot resonator. Its loaded quality factor $Q_{tot}$ may be $$\left(\frac{\Delta n}{n_0}\frac{U_{BTO}}{U_{tot}} + \frac{2}{Q_{int}}\right)^{-1} \leq Q_{tot} \leq \frac{1-\sqrt{R_0}}{2} Q_{int},$$

where Δn is the change in the real part of the refractive index of the layer of electro-optic material, $n_0$ is the refractive index of the layer of electro-optic material without an applied electric field, ($U_{BTO}/U_{tot}$) is a fraction of energy in the layer of electro-optic material, $Q_{int}$ is an intrinsic quality factor of the Fabry-Perot resonator, and $R_0$ is a reflectance on resonance of the Fabry-Perot resonator. The Fabry-Perot resonator can be constructed of a quarter-wavelength layer of TiO$_2$ on a distributed Bragg reflector comprising alternating quarter-wavelength layers of TiO$_2$ and SiO$_2$.

The electro-optic material may include barium titanate. This barium titanate can be a single-domain barium titanate crystal with a crystalline c axis oriented at an angle of about 40 degrees with respect to the second direction in a plane orthogonal to the first direction. Alternatively, the barium titanate can be a multi-domain barium titanate crystal with crystalline c axes oriented at an angle of about 45 degrees with respect to the second direction in a plane orthogonal to the first direction.

The SLM may also include an array of microlenses in optical communication with the array of phase shifters. Each microlens in the array of microlens focuses the incident light to a spot within the layer of electro-optic material in a corresponding phase shifter. The microlenses can be disposed on the array of phase shifters. Or each microlens can be disposed within the Fabry-Perot resonator of the corresponding phase shifter.

Each phase shifter in the array of phase shifters can include a refractive index perturbation that confines the incident light laterally within that phase shifter.

Another inventive SLM includes first and second reflectors (e.g., first and second distributed Bragg reflectors), a layer of electro-optic material between the first and second reflectors, and an array of electrodes in electrical communication with the layer of electro-optic material. The first and second reflectors have different reflectivities and reflect light in a first direction. The layer of electro-optic material shifts a phase of the light incident in the first direction. And the array of electrodes generates electric fields in a second direction orthogonal to the first direction. These electric fields modulate a real part of a refractive index of respective sections of the layer of electro-optic material.

This SLM can also include a microlens array, in optical communication with the layer of electro-optic material, to confine the incident light laterally within the layer of electro-optic material. Or it can include at least one defect, in optical communication with the layer of electro-optic material, to confine the incident light laterally within the layer of electro-optic material.

Yet another inventive SLM includes a photonic crystal layer, a layer of electro-optic material, and an array of electrodes. The photonic crystal layer supports a guided mode resonance. The layer of electro-optic material is optically coupled to the guided mode resonance of the photonic crystal layer. And the array of electrodes generates electric fields modulating a refractive index of respective sections of the layer of electro-optic material, thereby shifting a center wavelength of the guided mode resonance.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 1A shows a spatial light modulator (SLM) phase shifter element composed of an electro-optic material in the cavity of a vertically oriented Fabry-Perot resonator and the corresponding electrical control components.

FIG. 1B shows an SLM made of array of phase shifter elements capable of modulating the spatial profile of the reflected wave front.

FIG. 6A is a plot of the simulated far-field reflection pattern for a 20×20 array of phase shifters modulated with a phase profile representing phase gradients ranging from 0.2π to π.

FIG. 6B shows line-cuts from FIG. 6A corresponding to $$\frac{d\phi}{dx} = 0.35\pi$$

(lower dashed line in FIG. 6A) and $$\frac{d\phi}{dx} = 0.85\pi$$

(upper dashed line in FIG. 6A).

FIG. 7A shows a simulated intensity profile of a varifocal metalens with a focal length of 250 μm using a 16×16 array of phase shifters.

FIG. 7B shows a simulated intensity profile of a varifocal metalens with a focal length of 500 μm using a 16×16 array of phase shifters.

FIG. 7C shows a simulated intensity profile of a varifocal metalens with a focal length of 750 μm using a 16×16 array of phase shifters.

Figure 8A:
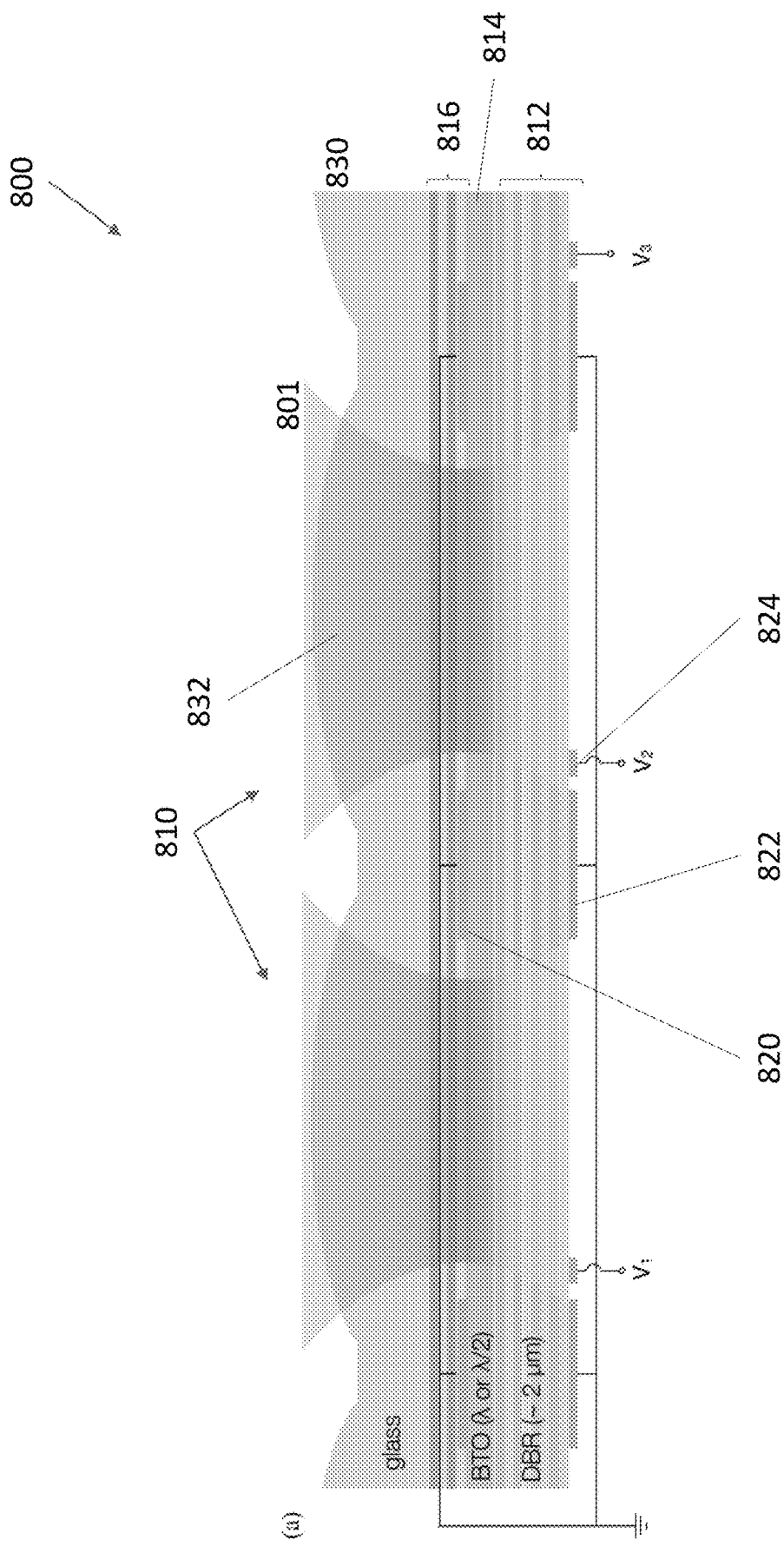

FIG. 8A shows an SLM with a planar DBR asymmetric Fabry-Perot vertical cavity with a microlens array on top.

Figure 8B:
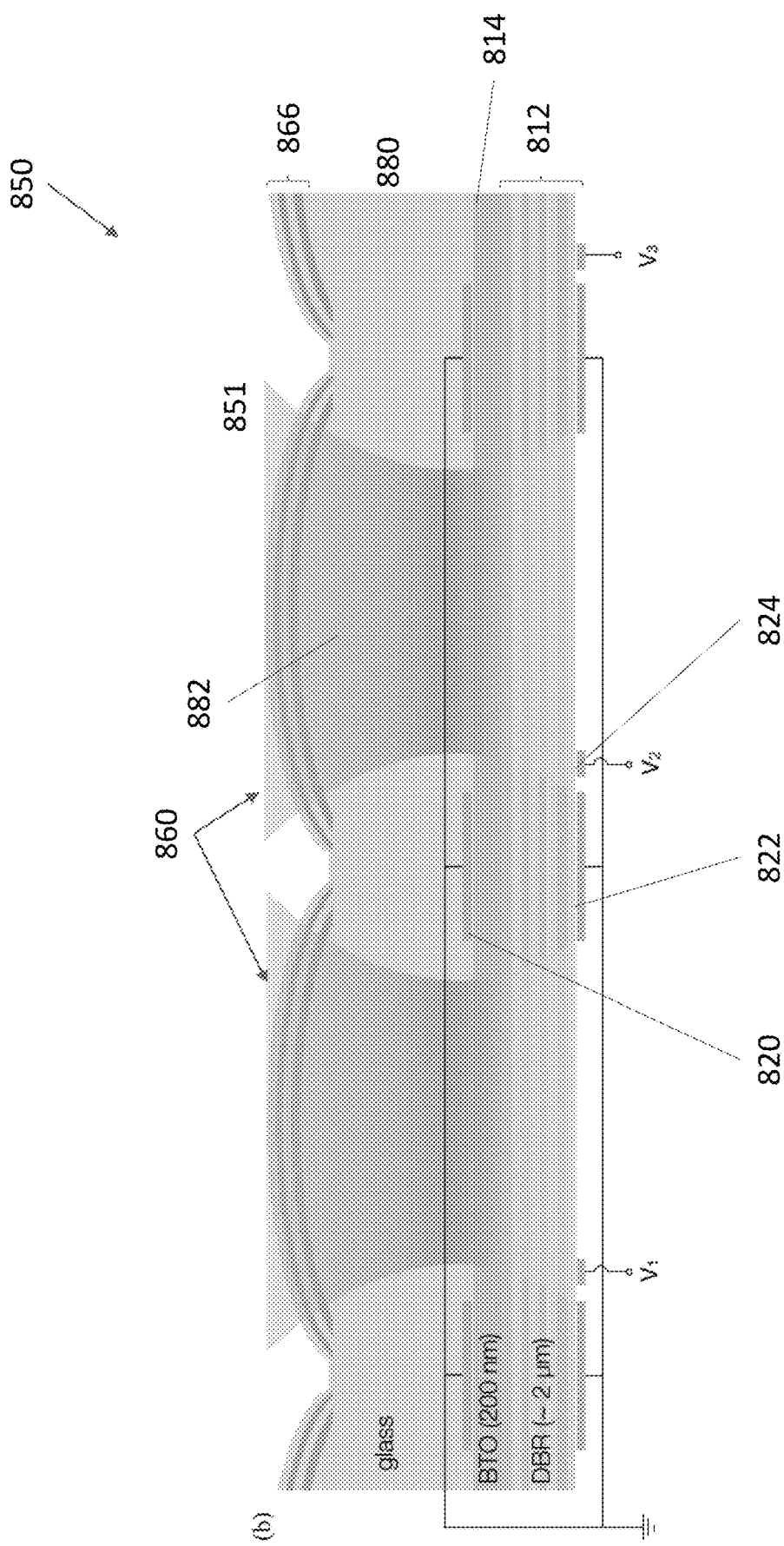

FIG. 8B shows an SLM with a reflective DBR backplane and a partially reflective top DBR mirror deposited on top of a microlens array.

Figures 9A, 9B:
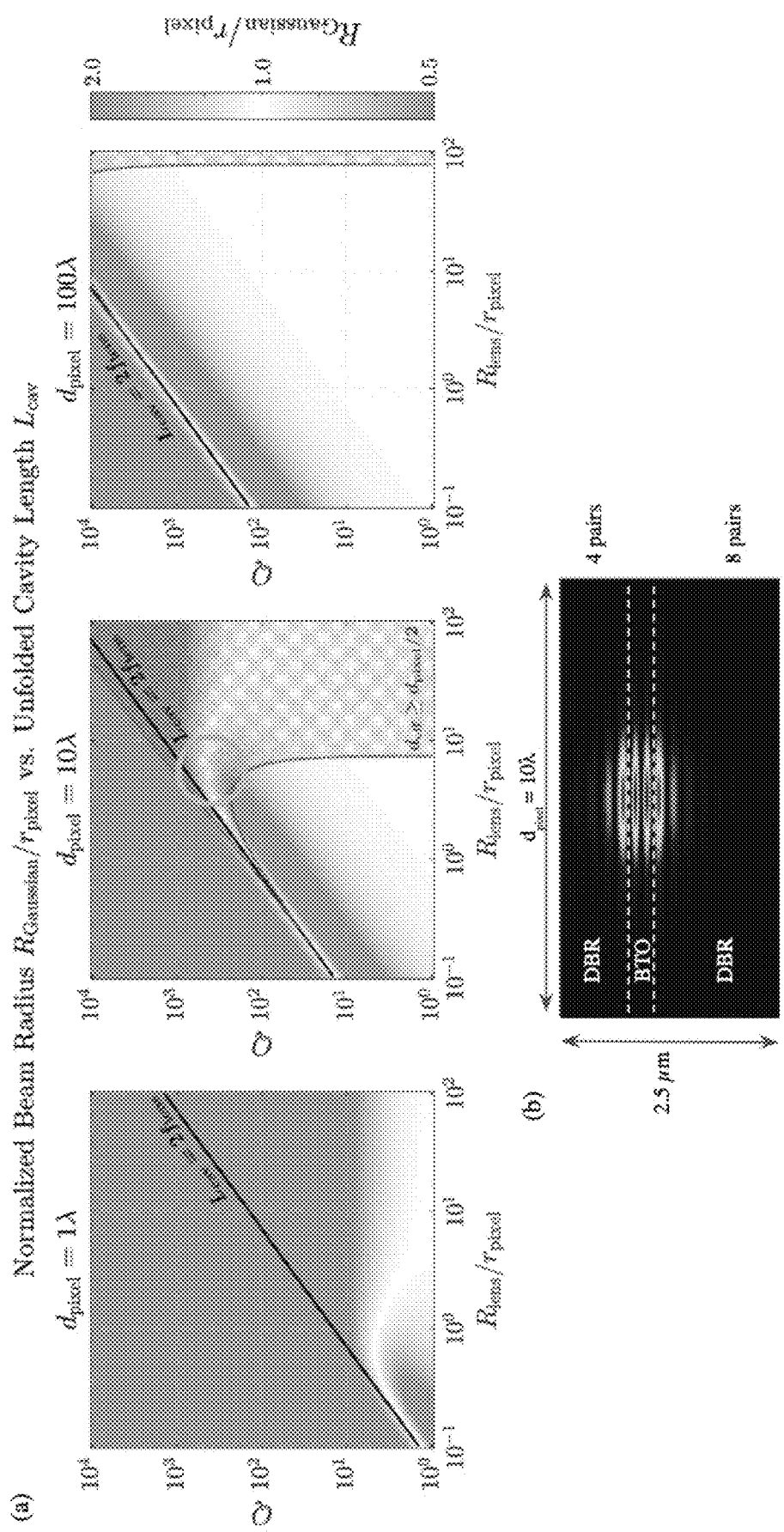

FIG. 9A shows the normalized beam radius as a function of the cavity's quality factor (Q=2πL for an intracavity propagation length L normalized to the resonant wavelength) and the microlenses' radius of curvature (corresponding to a lens focal length f and numerical aperture NA) for different pixel sizes in the SLM of FIG. 8A.

FIG. 9B is a plot of the intensity profile of an SLM with a pixel width of $d_{pixel}=10\lambda$.

Figure 10:
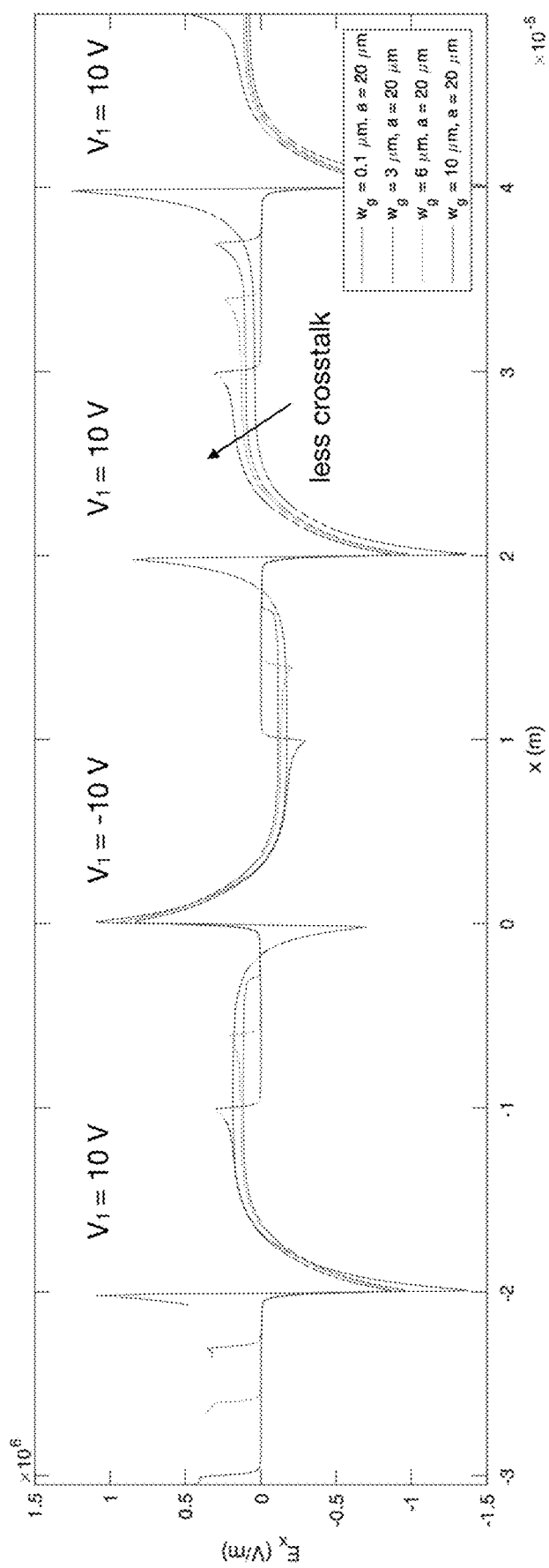

FIG. 10 is a plot of a simulated horizontal electric field profile for the electrode design in the SLM of FIG. 8A.

Figure 11:
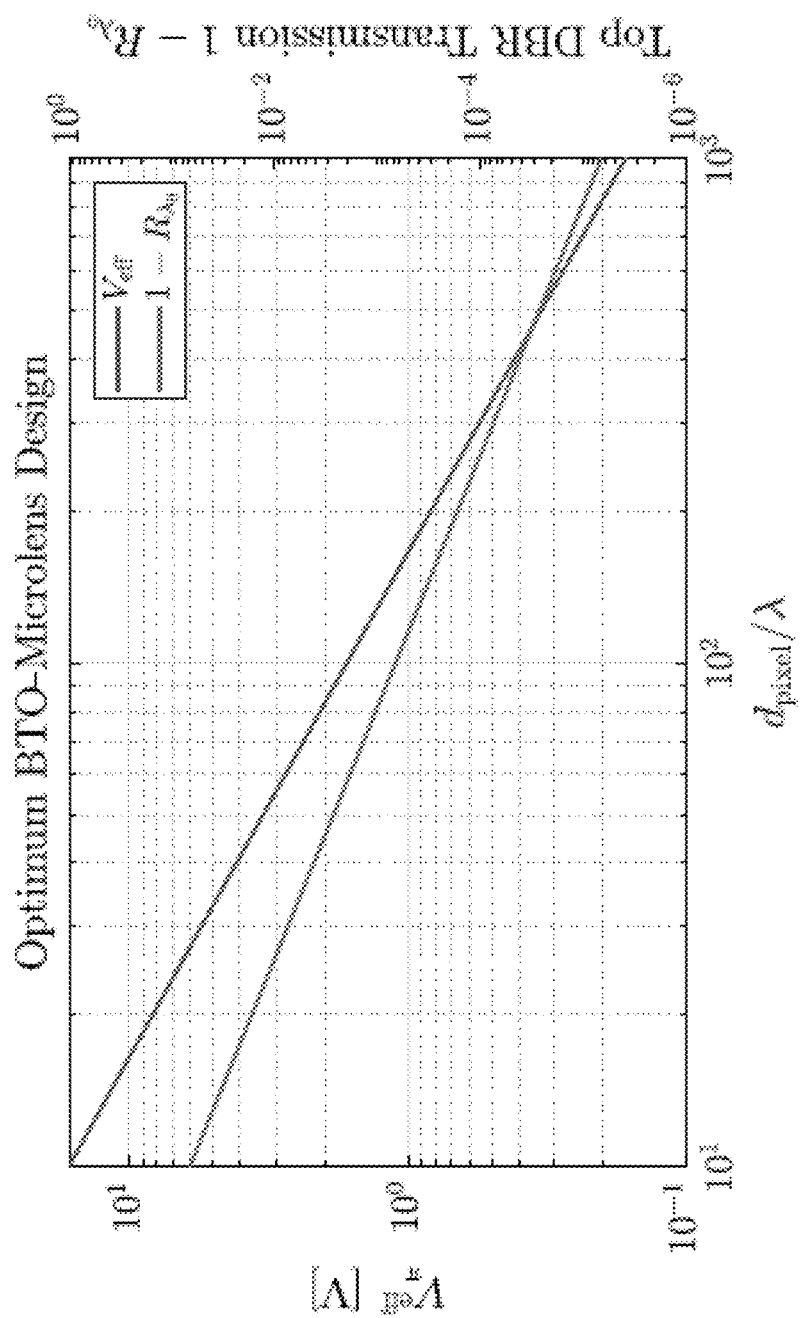

FIG. 11 shows analytic approximations for optimum half-wave voltage and top mirror reflectivity as a function of pixel diameter normalized by wavelength for the SLM in FIG. 8A.

FIG. 12A is a plot of the simulated near-field intensity and phase spatial profile of a pixel in the SLM of FIG. 8A.

FIG. 12B is a plot of the simulated cross-sectional intensity spatial profile of the cavity mode in a pixel of the SLM of FIG. 8A.

FIG. 12C is a plot of the reflection amplitude and phase spectrum of the microcavity array in FIG. 8A.

Figures 13A, 13B:
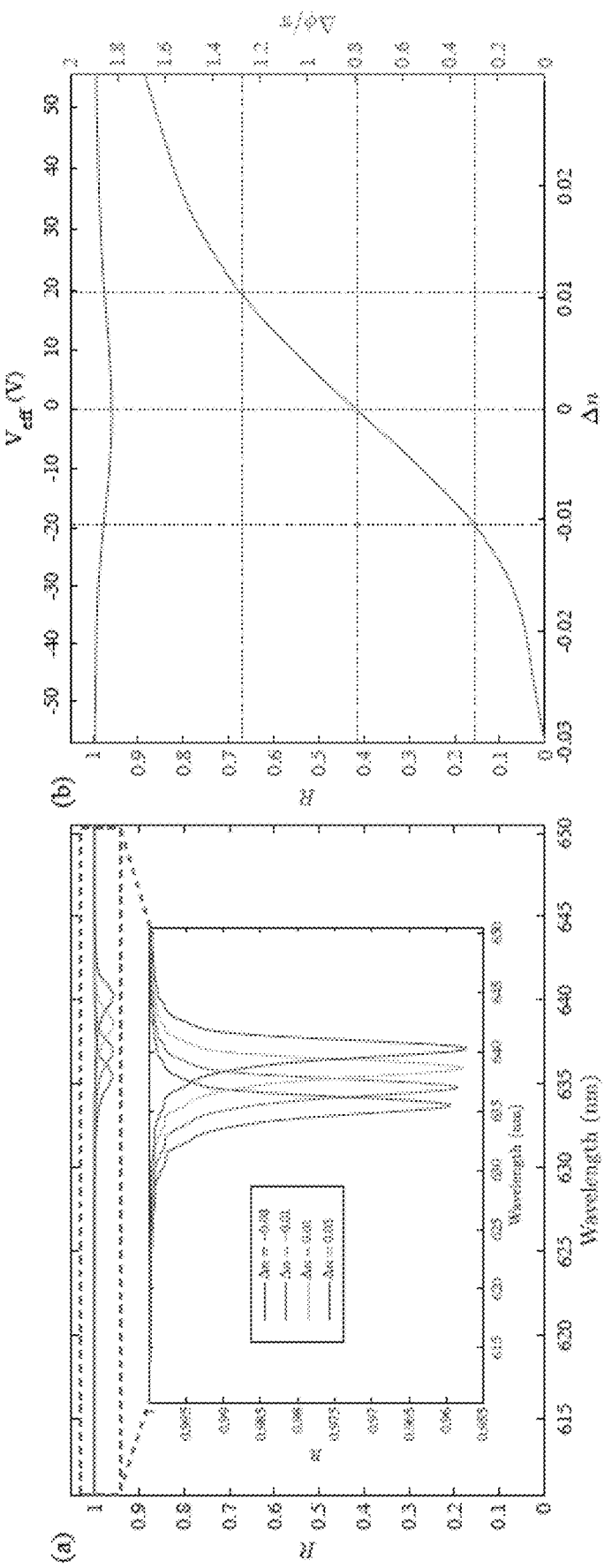

FIG. 13A shows reflection amplitude spectra of the microcavity array for different BTO refractive indices.

FIG. 13B shows reflection amplitude and phase at a wavelength of λ=637 nm as a function of the refractive index change Δn of BTO and the corresponding effective voltage $V_{eff}$.

Figure 14A:
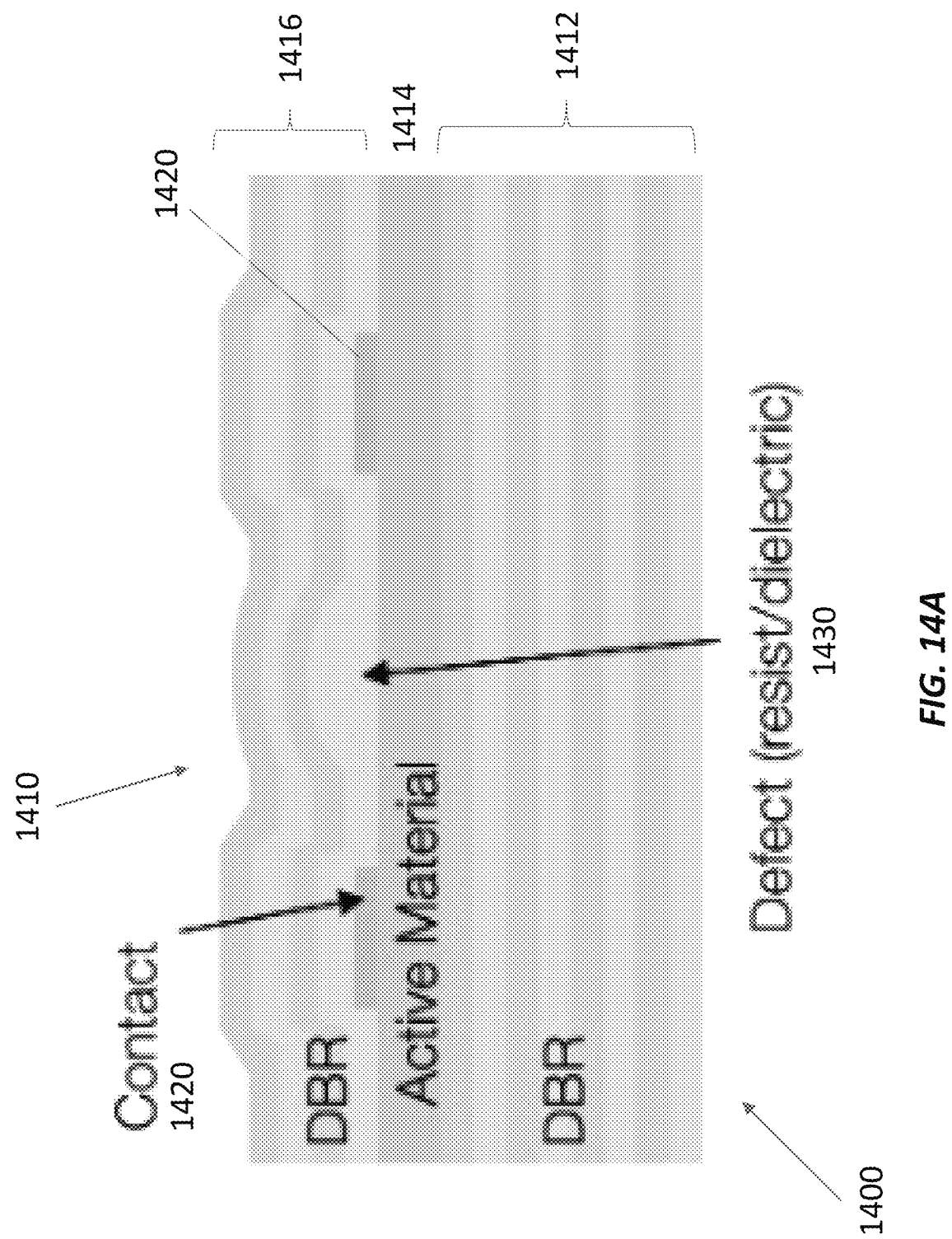
Figure 14B:
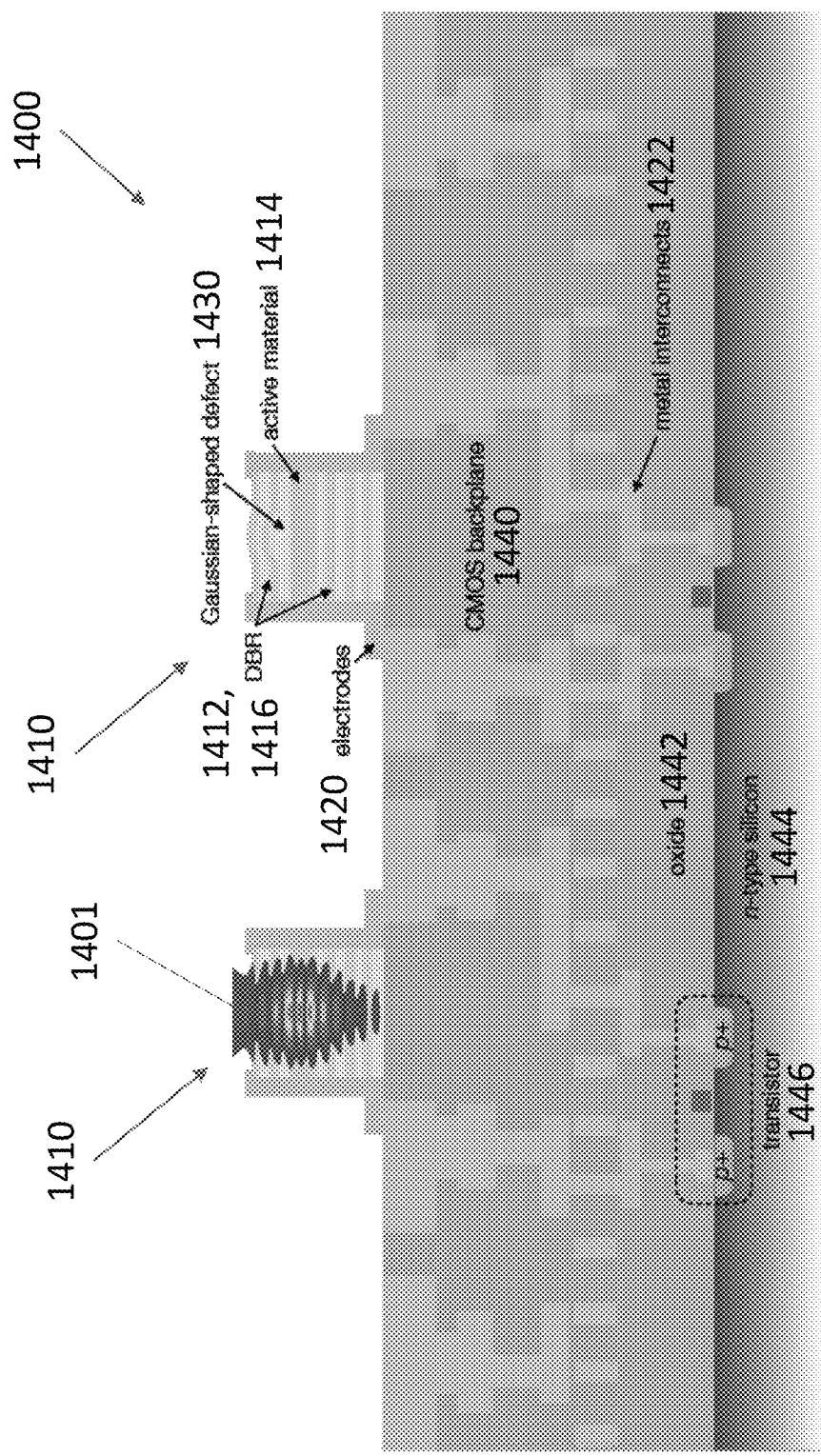

FIGS. 14A and 14B show an SLM where each phase shifter pixel includes a one-sided vertical microcavity with lateral optical confinement provided by a Gaussian-shaped defect.

Figure 15C:
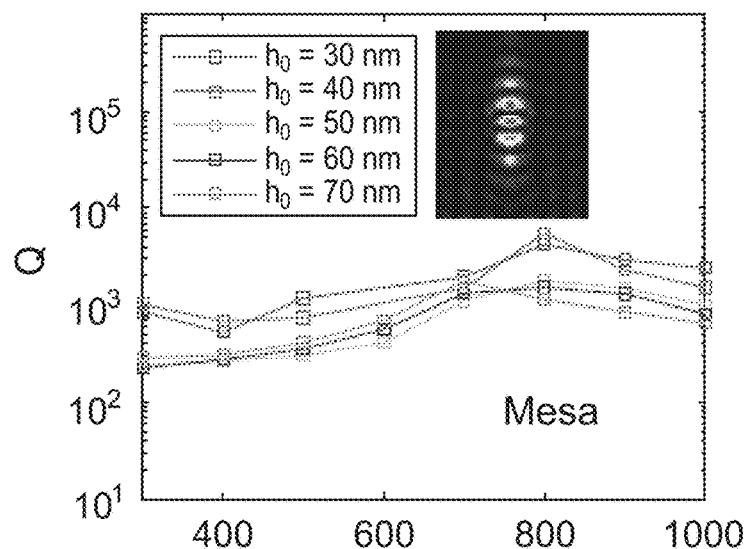
Figure 15B:
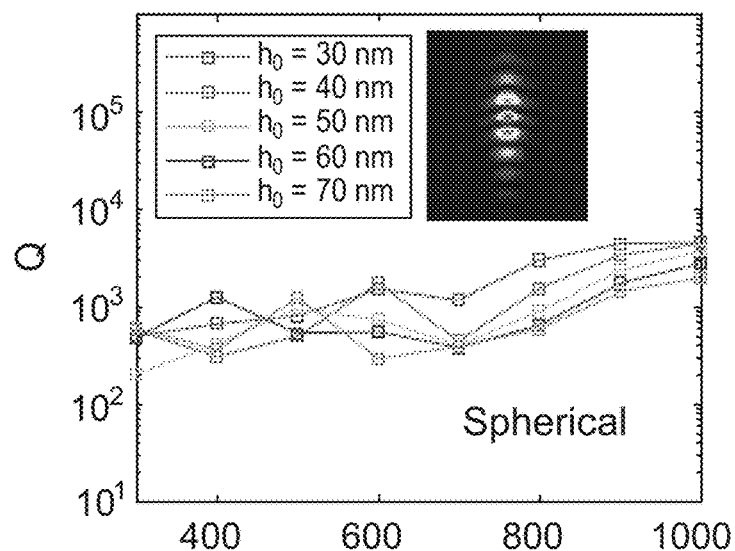
Figure 15A:
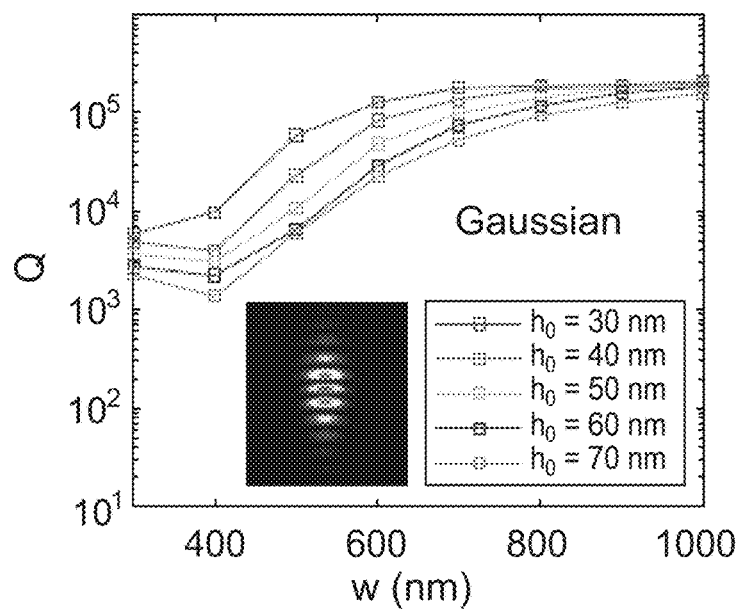

FIGS. 15A-15C show intrinsic quality factors versus defect width of vertical microcavities whose lateral optical confinement is provided by defects with mesa, spherical, and Gaussian shapes and different heights.

FIGS. 16A-16C show a quality factor analysis of the Gaussian-defect vertical cavity in FIG. 14 for different defect widths.

Figure 17:
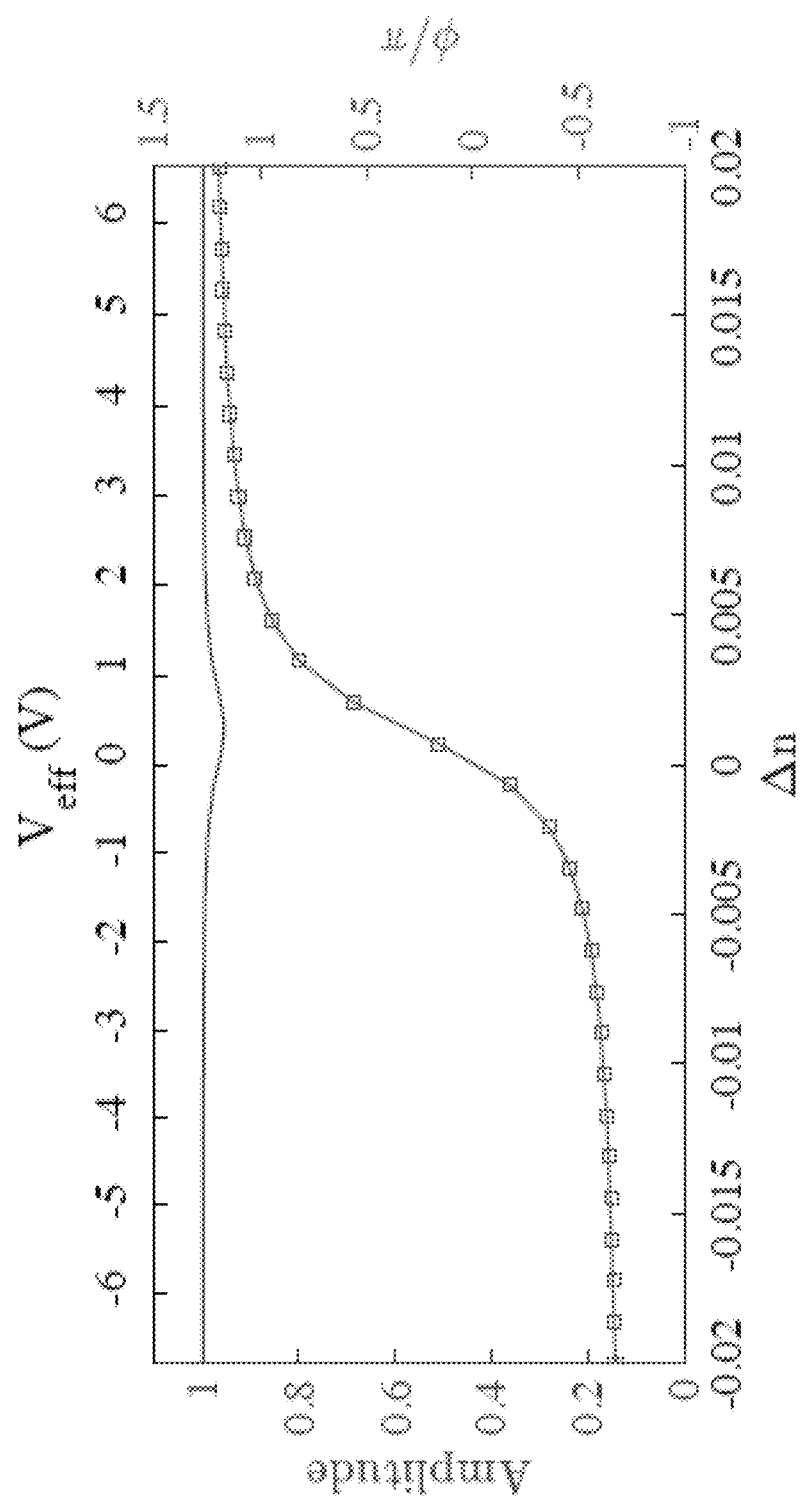

FIG. 17 is a plot of the modulation characteristics of a Gaussian-defect vertical microcavity phase shifter element with design parameters D=600 nm and $N_{top}=7$.

Figure 18:
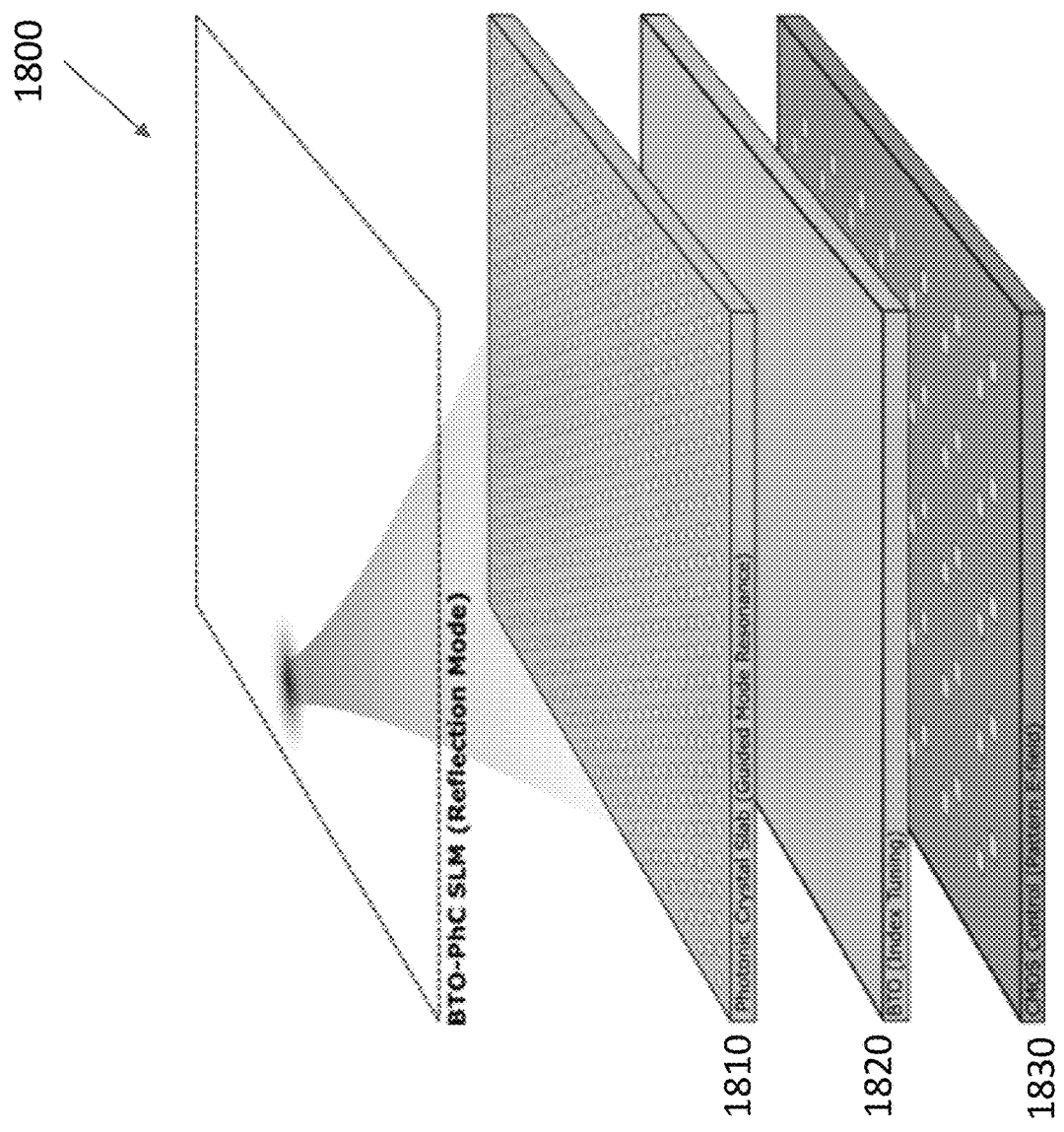

FIG. 18 shows a guided-mode resonator-based SLM.

Figure 19B:
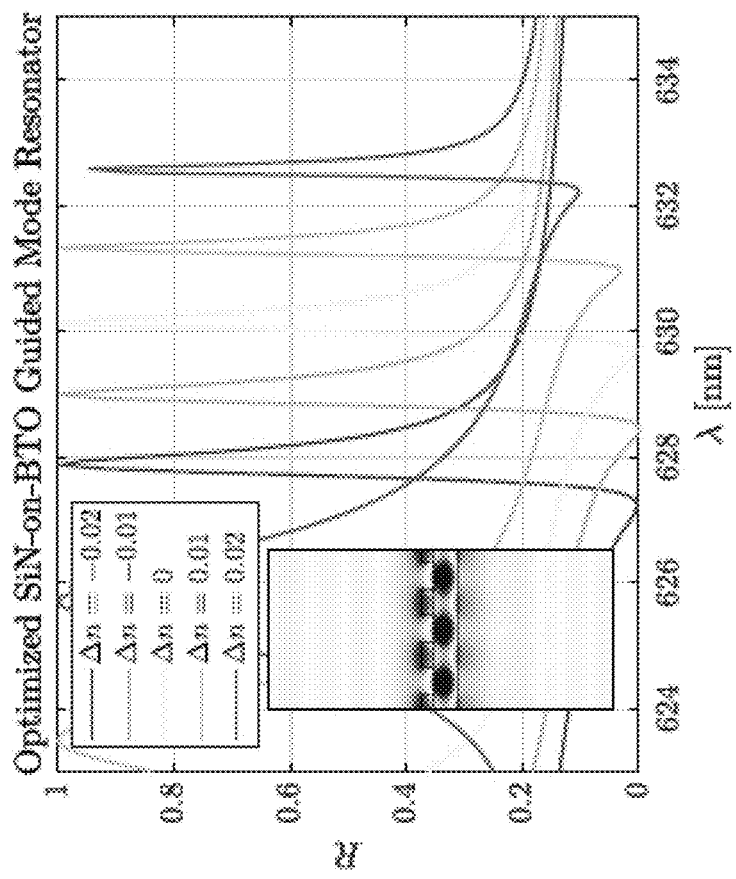
Figure 19A:
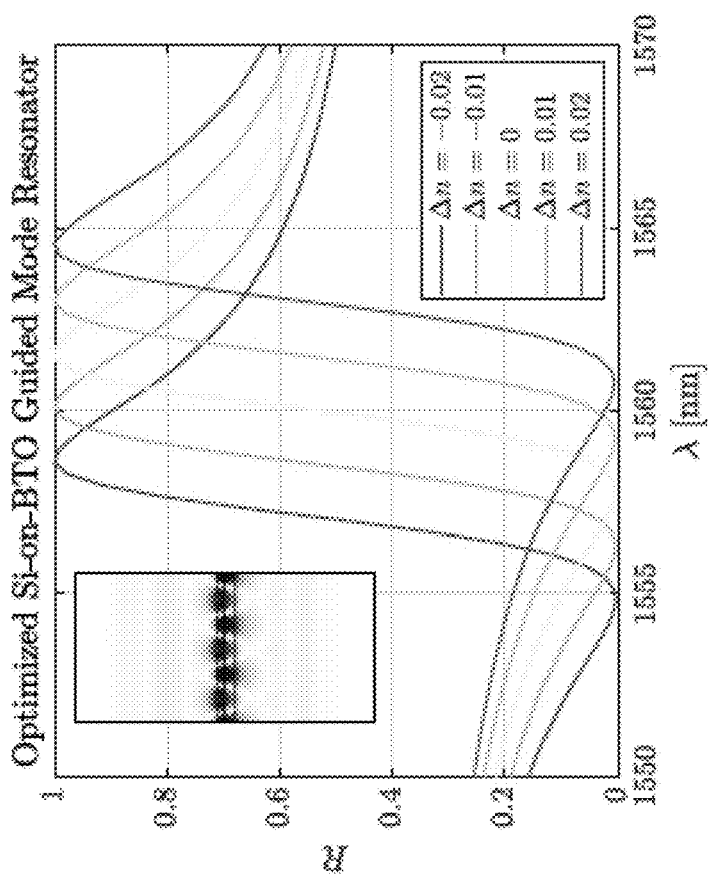

FIGS. 19A and 19B show power reflection spectra of optimized designs for infrared (silicon slab on BTO substrate) and visible (silicon nitride slab on BTO substrate), respectively, guided mode resonator-based spatial light modulation as a function of applied BTO index shift Δn. The insets show the electric field distribution in the photonic crystal slab and substrate.

Figure 20:
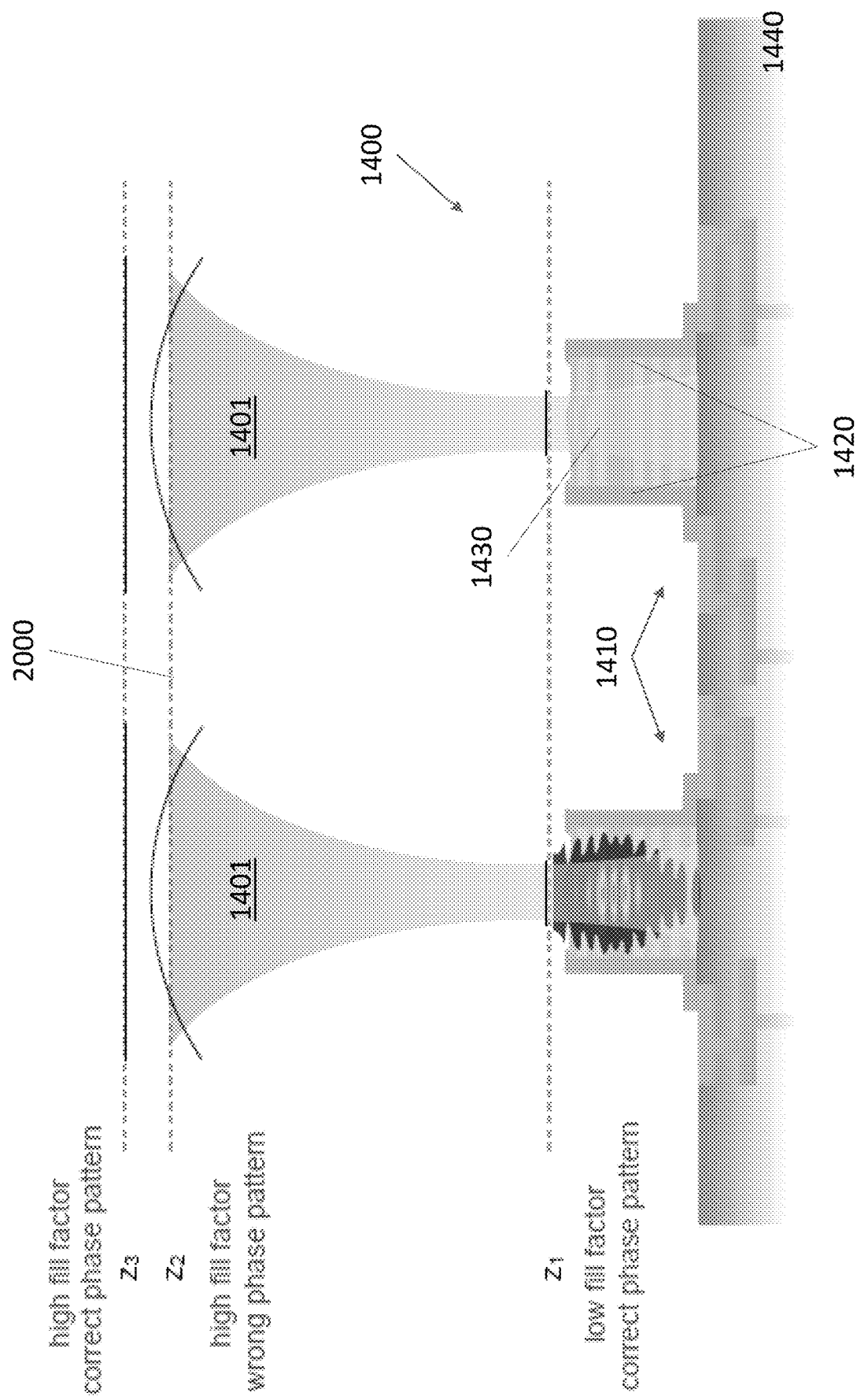

FIG. 20 illustrates a phase mask a short distance above the phase shifter pixels in a micropillar SLM. Inserting the phase mask allows conversion of a small pixel fill factor to a near-unity pixel fill factor for the SLM without compromising the intended phase pattern.

FIGS. 21A-21F show the amplitude and phase of reflected waves propagating in the longitudinal direction and far-field profiles of a Gaussian-defect vertical cavity SLM with or without the phase mask.

Figure 22B:
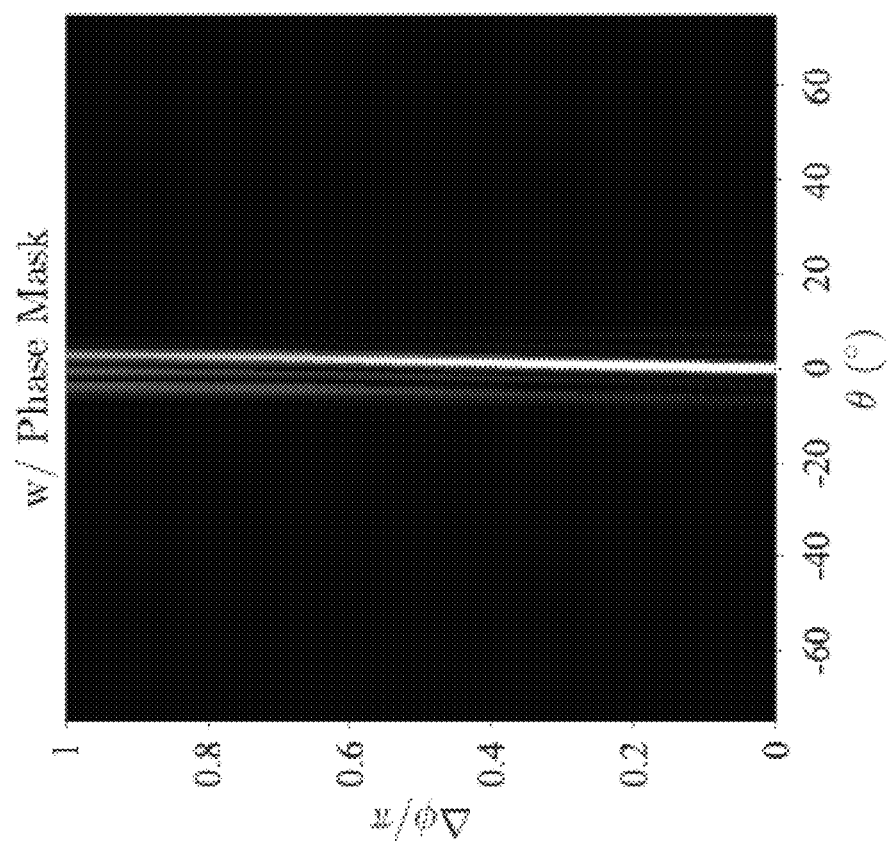
Figure 22A:
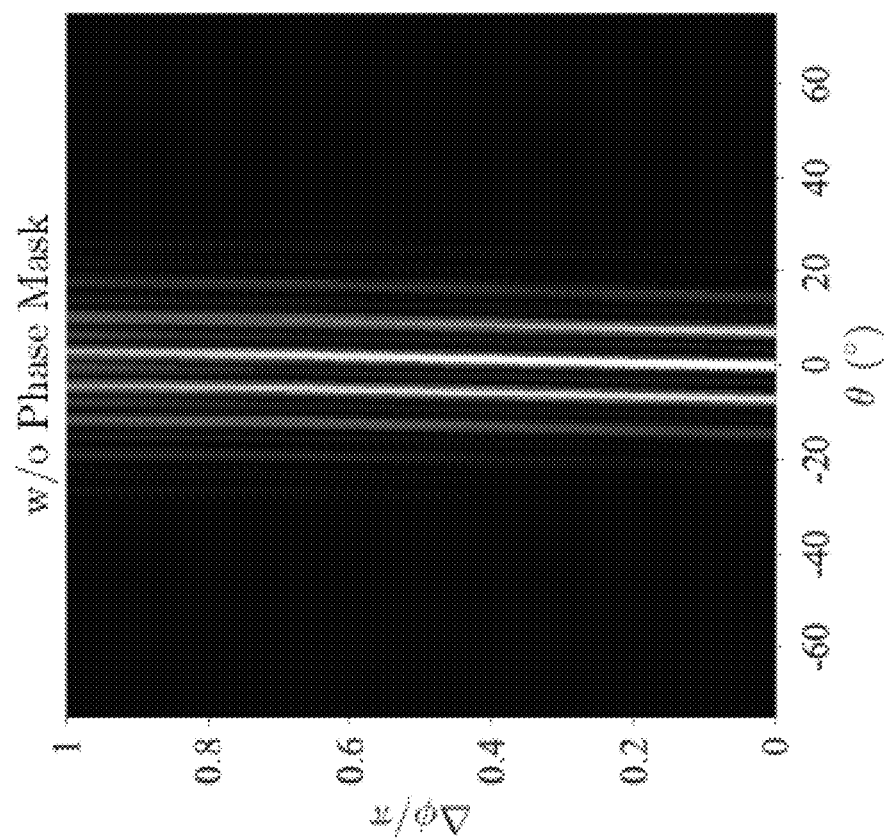

FIG. 22A is a plot of the far-field intensity for an array of Gaussian-defect vertical cavity pixels with a linear phase gradient without a phase mask.

FIG. 22B is a plot of the far-field intensity for an array of Gaussian-defect vertical cavity pixels with a linear phase gradient with a phase mask.

Figure 23:
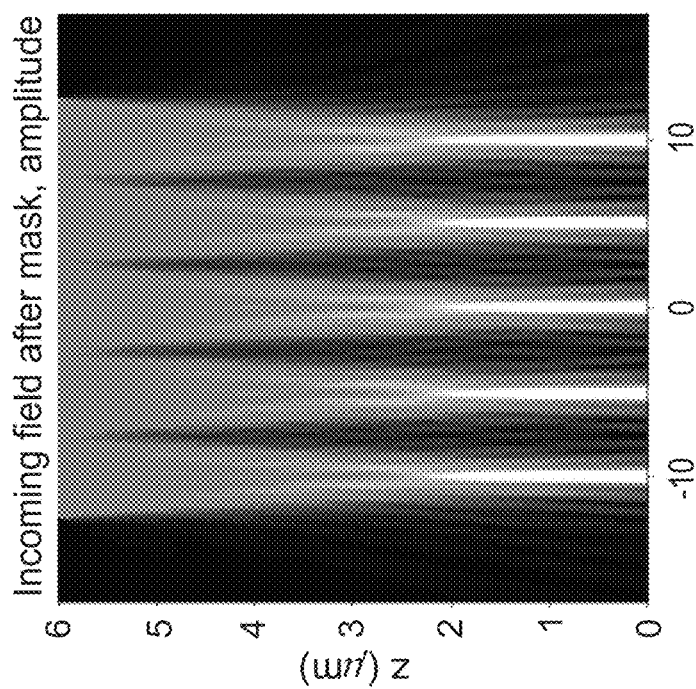

FIG. 23 is a simulation of an incoming plane wave after passing through the phase mask.

Figure 24:
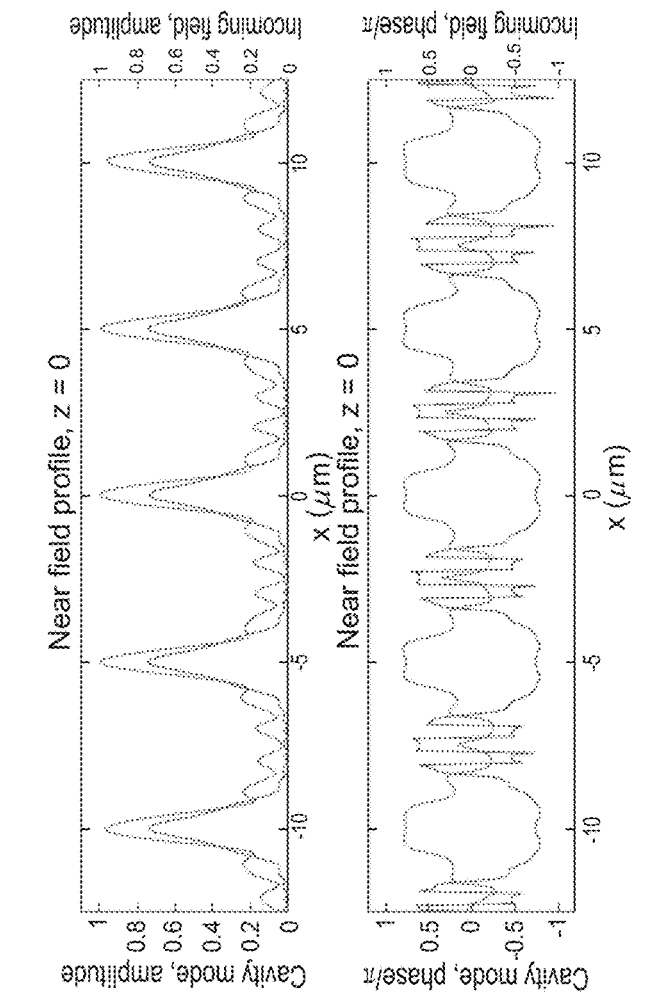

FIG. 24 is plot of the incoming wave's spatial amplitude (top) and phase (bottom) profiles with the microcavity's mode profile in the SLM of FIG. 20.

DETAILED DESCRIPTION

A high-speed, compact, phase-only spatial light modulator (SLM) can be made from a tunable microcavity array, with electro-optic material, such as a thin film of ferroelectric BTO, as the active layer. (Other suitable electro-optic materials include lithium niobate ($LiNbO_3$), lithium tantalate ($LiTaO_3$), potassium di-deuterium phosphate (KDP), β-barium borate (BBO), potassium titanium oxide phosphate (KTP), gallium arsenide (GaAs), and indium phosphide (InP).)

The microcavity extends the effective interaction length of the incident light and the thin film of BTO and isolates the optical mode of each individual pixel. This can be achieved by patterning the layers that make up the microcavity into laterally separated micropillars, by disposing a microlens array on the layers, or by embedding defects (index perturbations) between or on the layers. In micropillar form, the microcavity array, which is also called a phase shifter array, achieves simulated π phase shifts for the reflected light under an applied bias voltage of 9.3 V, while maintaining a uniform amplitude, indicating phase-only modulation. The other designs have even smaller half-wave voltages (e.g., 5 V).

An inventive SLM can provide voltage-tunable continuous beam deflection or act as a voltage-tunable varifocal lens. With the high diffraction efficiency enabled by the phase-only modulation and the moderate operating voltage and the high modulation speed (e.g., GHz rates) enabled by the electro-optic effect of the ferroelectric BTO, as well as the experimentally feasible geometry, this SLM architecture promises a wide range of new applications ranging from fully tunable metasurfaces to optical computing accelerators, high-speed interconnects, true 2D phased array beam steering, and quantum computing with cold atom arrays.

Tunable Microcavities as Phase Shifter Elements

FIGS. 1A and 1B show an individual vertical microcavity pixel 110 and a phase-only SLM 100 made up of an array of vertical microcavity pixels 110, respectively. The vertical microcavity pixel 110, also called a phase shifter element or phase shifter, includes a layer of electro-optic (EO) material 114—here, BTO—embedded inside an optical cavity. The BTO layer 114 has a thickness of one wavelength and is sandwiched between two distributed Bragg reflectors (DBRs) 112 and 116 with alternating quarter-wavelength thickness layers of $TiO_2$ and $SiO_2$, creating a Fabry-Perot optical cavity with a strongly enhanced optical field in the BTO layer 114. The optical cavity is one-sided, or asymmetric—the lower DBR 112 has a higher reflectivity than the upper DBR 116—so light 101 enters and leaves preferentially through the upper DBR 116.

A pair of transparent conductive oxide electrodes 120 on the two opposite sides of the vertical microcavity, using materials such as indium tin oxide (ITO), form a parallel plate capacitor that generates a horizontally oriented electric field (E field) 125 across the BTO layer when a voltage is applied to the electrodes 120 by a voltage source 124. (Put differently, the E field is orthogonal to the pixel's optical axis.) This E field 125 changes the refractive index n of the electro-optic material 114, which in turn shifts the resonant wavelength of the optical cavity, changing the phase of the light 101 reflected by the microcavity pixel 110. The SLM 100 can modulate the phase or amplitude depending on the resonator's reflection coefficient.

The transparent oxide electrodes 120 are connected to metal contacts 122 in a complementary metal-oxide-semiconductor (CMOS) substrate 102, allowing each pixel 110 to be addressed independently and electrically with corresponding CMOS circuitry (not shown). Each microcavity pixel 110 in the SLM 100 has full 0 to $2\pi$ phase control of the reflected light 101 and so can vary the reflectance phase independently of the reflectance amplitude thanks to its asymmetric Fabry-Perot vertical microcavity, which operates in the over-coupled regime.

To facilitate coupling of the cavity mode with the free-space mode, higher-order waveguide modes that can propagate vertically in the DBR layers of the micropost should be suppressed. This can be achieved by adding an extra quarter-wavelength layer 118 of $TiO_2$ to the top of the micropost and etching a circular hole at the center of this layer 118 as illustrated in FIG. 1A. The circular hole is engineered to roughly match the profile of the desired Gaussian mode propagating in the micropost, which may have a circular or square cross section. For an operating wavelength of 1550 nm, the circular hole has a diameter of 3 μm. This extra quarter-wavelength layer 118 causes constructive interference at the center of the micropost 110 and destructive interference at the peripheral areas, effectively enhancing the fundamental mode of the DBR waveguides 112 and 116 layers and suppressing the higher-order modes.

The phase shifters 110 shown in FIGS. 1A and 1B are designed for single-wavelength operation (e.g., 1550 nm), but their dimensions can be modified to change the operating wavelength. The operating wavelength and operating wavelength range depend on the design of the Fabry-Perot cavity (pixel 110) and on the electro-optic material 114. Thin-film BTO has a large EO coefficient at 1550 nm. Bulk BTO has high electro-optic coefficients at other wavelengths, including visible and ultraviolet (UV) wavelengths, so thin-film BTO devices could work at visible or UV wavelengths with appropriate Fabry-Perot cavities.

The phase shifters 110 can have any suitable cross-sectional shape (e.g., square, circular, hexagonal, etc.). A phase shifter 110 with a square cross section tends to be easier for angled sputtering of the ITO side contacts (electrodes 120). (When doing angled sputtering after etching the posts, it can be hard to precisely control the azimuthal angle such that ITO is deposited on the two opposite sides of the post. Alternatively, we can first etch a grating pattern, then deposit the ITO with angled sputtering and etch the grating into posts after sputtering. This reduces or eliminates potentially deleterious effects of a misalignment of azimuthal angle.)

Phase Shifter Element Design Methodology

The complex reflection coefficient of a one-sided resonator like the microcavity pixels 110 in FIGS. 1A and 1B, calculated using the temporal coupled-mode theory (TCMT), can be expressed as $$r(\omega) = \frac{(1/\tau_e^2 - 1/\tau_o^2) - (\omega_0 - \omega)^2 + 2j(\omega_0 - \omega)\frac{1}{\tau_e}}{(1/\tau_e^2 + 1/\tau_o^2) + (\omega_0 - \omega)^2} \quad (2)$$

where $1/\tau_0$ and $1/\tau_e$ are the intrinsic loss rate of the resonator and the coupling rate between the resonator mode and the free-space mode, respectively, and $\omega_0$ is the resonance frequency. This indicates that a detuning of the frequency from the resonance results in changes in the reflectance amplitude and phase. For a phase shifter resonator (e.g., pixel 110 in FIGS. 1A and 1B), as the voltage applied changes the refractive index of the active material BTO, the resonator's resonant frequency shifts. This shift of the resonance frequency modifies the amplitude and phase of the reflected wave front.

Figure 2A:
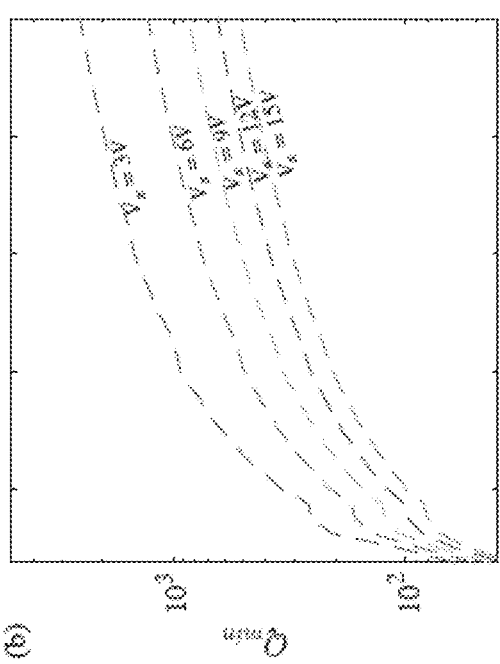
FIG. 2A is a plot of the maximum loaded quality factor Q for the reflectance of different microcavity resonators (the inset shows reflectance in different regimes of coupling between the resonator mode and the free-space mode).

The coupling between the resonator mode and the free space mode places an upper bound on the resonator's quality factor. Depending on the relative magnitude of the intrinsic loss rate $1/\tau_0$ and the resonator-free-space coupling rate $1/\tau_e$, the resonator's coupling to the free space mode can be categorized into three regimes: under-coupled ($1/\tau_0 > 1/\tau_e$), critically coupled ($1/\tau_0 = 1/\tau_e$), and over-coupled ($1/\tau_0 < 1/\tau_e$) regimes. As illustrated in the inset of FIG. 2A, to achieve a full 0 to $2\pi$ reflectance phase shift with little to no amplitude variation, the resonator mode should be over-coupled to the free-space mode. From Equation (2), the reflection coefficient of the resonator, which is typically set to be equal to or greater than 0.9 (e.g., 0.95, 0.99, and so on), at the resonance frequency $\omega = \omega_0$ can be expressed in terms of the resonator's quality factors as $$R_0 = R(\omega = \omega_0) = \left(\frac{\frac{1}{\tau_e} - \frac{1}{\tau_0}}{\frac{1}{\tau_e} + \frac{1}{\tau_0}}\right)^2 = \left(\frac{\frac{1}{\tau_e} + \frac{1}{\tau_0} - \frac{2}{\tau_0}}{\frac{1}{\tau_e} + \frac{1}{\tau_0}}\right)^2 = \left(\frac{\frac{1}{Q_{tot}} - \frac{2}{Q_{int}}}{\frac{1}{Q_{tot}}}\right)^2 \quad (3)$$

where $Q_{int}$ and $Q_{tot}$ are the resonator's intrinsic quality factor (Q) and loaded Q, respectively. For the resonator to be over-coupled to the free-space mode and its reflection on resonance to be greater than a given value $R_0$, Equation (3) places an upper bound on the resonator's loaded Q:

$$Q_{tot} \leq \frac{1 - \sqrt{R_0}}{2} Q_{int} \quad (4)$$

On the other hand, the amount of frequency detuning that can be produced by a given applied voltage places a lower bound on the resonator's loaded Q. The frequency detuning can be expressed in terms of the change of the material's electric permittivity E using perturbation theory as $$\Delta\omega = -\frac{\omega_0}{2}\frac{\int d^3\vec{r}\Delta\epsilon(\vec{r})|\vec{E}(\vec{r})|^2}{\int d^3\vec{r}\epsilon(\vec{r})|\vec{E}(\vec{r})|^2} + O(\Delta\epsilon^2) \quad (5)$$

The second term in Equation (5) represents the second and higher order effects and is negligible when $|\Delta\epsilon/\epsilon|<1\%$. Since $n=\sqrt{\epsilon}$, we have $\Delta\epsilon\approx 2\epsilon\Delta n/n$. The detuning can then be written as $$\Delta\omega = -\frac{\omega_0}{2}\frac{\int d^3\vec{r}2\epsilon(\vec{r})\Delta n(\vec{r})/n(\vec{r})|\vec{E}(\vec{r})|^2}{\int d^3\vec{r}\epsilon(\vec{r})|\vec{E}(\vec{r})|^2} \quad (6)$$

$$= -\omega_0\frac{\int_{BTO} d^3\vec{r}\epsilon(\vec{r})\Delta n(\vec{r})/n(\vec{r})|\vec{E}(\vec{r})|^2}{\int d^3\vec{r}\epsilon(\vec{r})|\vec{E}(\vec{r})|^2}$$

$$= -\omega_0\frac{\Delta n}{n_0}\frac{\int_{BTO} d^3\vec{r}\epsilon(\vec{r})|\vec{E}(\vec{r})|^2}{\int d^3\vec{r}\epsilon(\vec{r})|\vec{E}(\vec{r})|^2}$$

$$-\omega_0\frac{\Delta n}{n_0}\frac{U_{BTO}}{U_{tot}}$$

where $n_0$ is the refractive of BTO without applied E field. From Equation (2), the detuning to produce a $\pi$ phase shift (from $-\pi/2$ to $\pi/2$) is $$\Delta\omega_\pi = 2\left(\frac{1}{\tau_e} - \frac{1}{\tau_0}\right) = \frac{\omega_0}{Q_{tot}} - \frac{2\omega_0}{Q_{int}} \quad (7)$$

which, according to Equation (6), corresponds to a refractive index change of $$\Delta n_\pi = -n_0\frac{\Delta\omega_\pi}{\omega_0}\frac{U_{tot}}{U_{BTO}} \quad (8)$$

$$= -n_0\left(\frac{1}{Q_{tot}} - \frac{2}{Q_{int}}\right)\frac{U_{tot}}{U_{BTO}}$$

Hence for a given $\Delta n$ to produce a phase shift greater than $\pi$, $$\left(\frac{\Delta n}{n_0}\frac{U_{BTO}}{U_{tot}} + \frac{2}{Q_{int}}\right)^{-1} \leq Q_{tot} \quad (9)$$

This is a lower bound on the resonator's loaded Q.

Figure 2B:
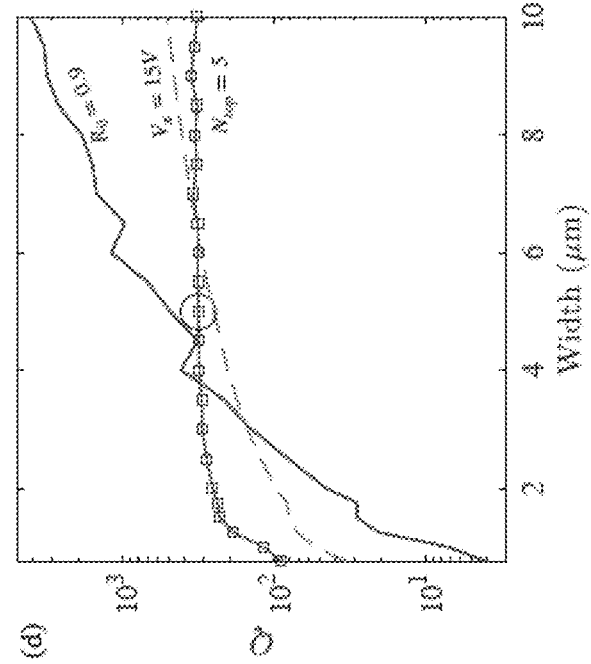
FIG. 2B is a plot of the minimum loaded Q for $V_\pi$, which is the voltage that produces a $\pi$ phase shift, for the microcavity resonators of FIG. 2A.

FIGS. 2A and 2B illustrate $Q_{max}$ and $Q_{min}$, the upper and lower bounds for the loaded Q, respectively, for various values of reflection on resonance and applied electrical voltages. The upper bound for the loaded Q can range from about 10 to about 10,000, depending on the width (lateral dimension) and reflectance of the phase shifter. Similarly, the lower bound for the loaded Q can range from about 1 to about 2,000, depending on the width (lateral dimension) and applied voltage.

The intrinsic Q is calculated by simulating the resonator with perfectly reflecting DBR mirrors (15 pairs of $TiO_2/SiO_2$ quarter-wavelength stacks) on both sides of the BTO layer. The value of the fraction of energy in the BTO layer $U_{BTO}/U_{tot}$ simulated for the intrinsic cavity is used to plot hence representing a stricter lower bound. The ratio $U_{BTO}/U_{tot}$ indicates how well the E field is confined to the BTO and is a measure of the modulator's efficiency. Ideally, this ratio is 1, because any E field outside the BTO does not modulate the light, so is wasted energy. The $\Delta n$ corresponding to the voltage applied is calculated assuming a parallel-plate capacitor is formed by the two vertical ITO layers.

Figure 2C:
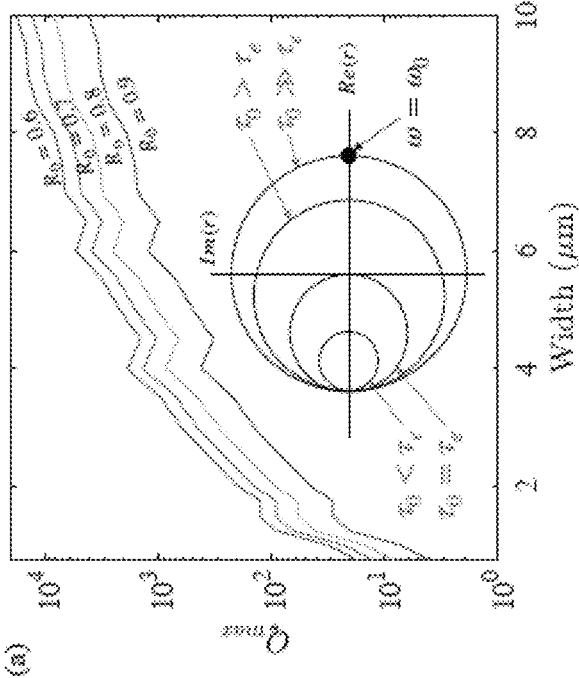
FIG. 2C is a plot of simulated cavity-loaded Q for different micropost widths D and different numbers of TiO$_2$/SiO$_2$ quarter-wavelength pairs $N_{top}$ in the upper distributed Bragg reflector of the microcavity resonator.
Figure 2D:
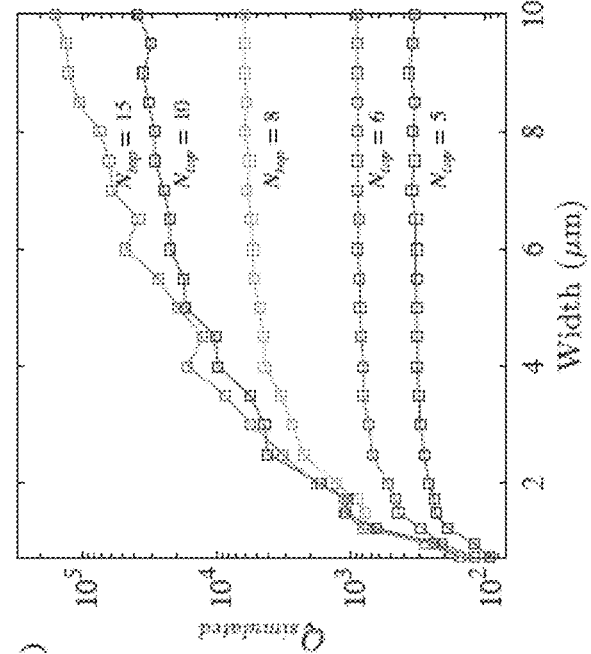
FIG. 2D is a plot of Q for a microcavity with D=5 µm and $N_{top}$=5 showing that the reflectance can be maintained above R=0.9 and the voltage for $\pi$ phase shift is <15 V.

Having established the upper and lower bounds of the resonator's loaded Q, the design parameters of the resonator (e.g., the width D of the vertical micropost and the number of pairs $N_{top}$ of $TiO_2/SiO_2$ quarter-wavelength stacks in the top DBR mirror in the SLM pixel of FIG. 1A) can be selected by sweeping the parameters and searching for a design that satisfies the bounding restrictions. FIG. 2C shows the simulated loaded Q for resonators with various D and $N_{top}$. Narrowing the design criteria to be $R_0>0.9$ and $V_\pi<15V$ yields $D=5.0\pm0.5$ µm and $N_{top}=5$, as illustrated in FIG. 2D.

Phase Shifter Element Resonator Design

Figures 3A, 3B:
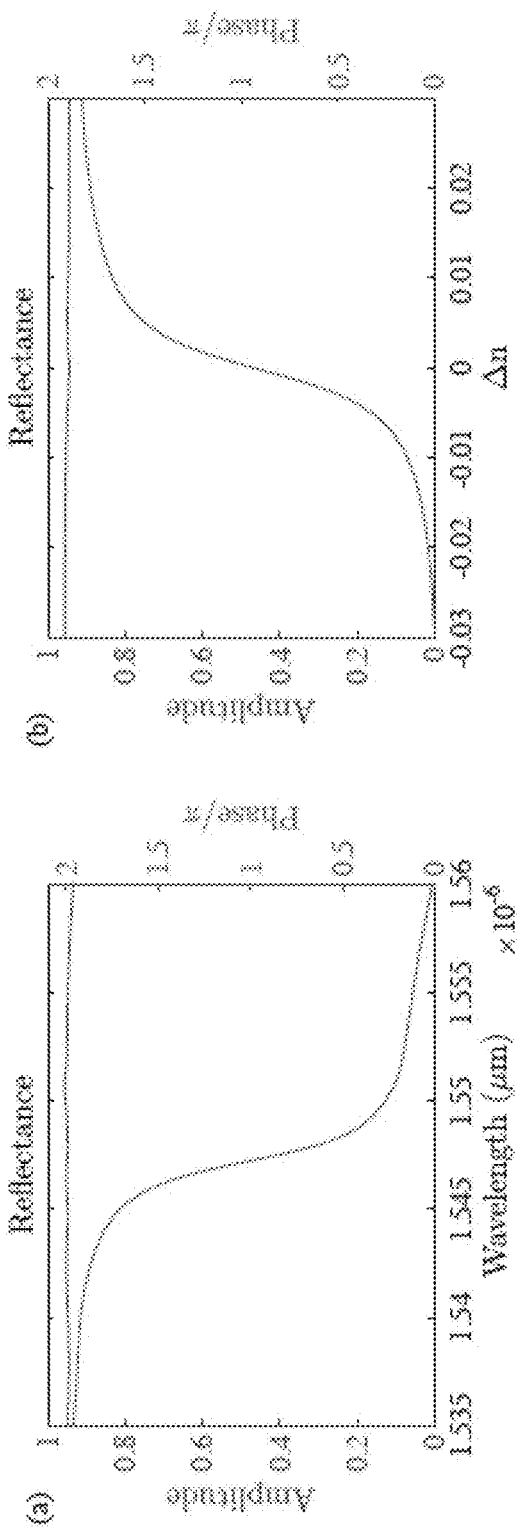
FIG. 3A shows the simulated reflectance spectrum of a phase shifter element with design parameters D=5 µm and $N_{top}$=5.
FIG. 3B shows the modulation characteristics as a function of the refractive index change of the active layer BTO for the phase shifter element with D=5 µm and $N_{top}$=5.

An optimized phase shifter element design achieves a full 0 to $2\pi$ phase control of the reflected light while keeping the reflectance amplitude nearly constant, enabling phase-only modulation. FIG. 3A shows the reflectance spectrum of the optimized resonator and FIG. 3B shows the modulation characteristics of the resonator as a function of the modulated refractive index of the active material BTO.

The reflectance amplitude is $R>0.9$ across the modulation range, and the voltage to reach a $\pi$ phase shift (corresponding to $\Delta n\sim 0.01$) is $V_\pi=9.3$ V. These values agree well with the predictions from the analysis above.

Figures 4A, 4B, 4C:
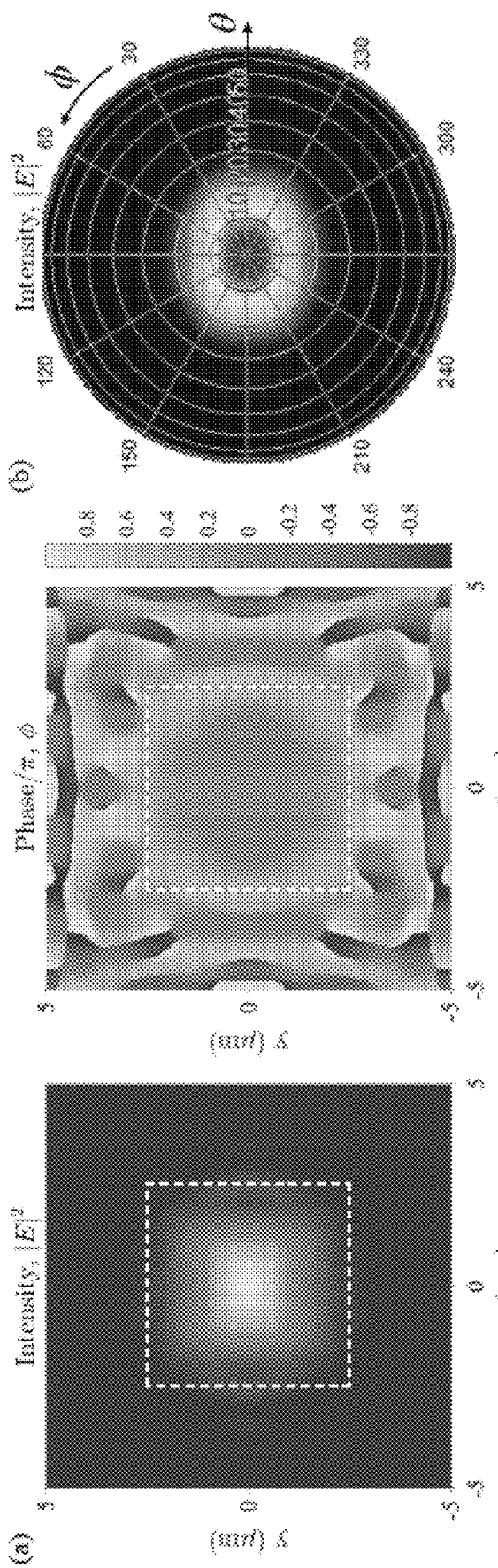
FIG. 4A is a plot of the near-field intensity profile of the top surface of a phase shifter element with D=5 µm and $N_{top}$=5.
FIG. 4B is a plot of the simulated near-field phase profile of the top surface of a phase shifter element with D=5 µm and $N_{top}$=5.
FIG. 4C is a plot of the simulated far-field intensity profile of radiation emitted by a phase shifter element with D=5 µm and $N_{top}$=5.

FIGS. 4A and 4B illustrate the electric field intensity and phase profiles, respectively, at the top surface of a micropillar SLM pixel (e.g., SLM pixel 110 in FIG. 1A). The concentrated E field at the center of the pixel indicates that the fundamental waveguide mode is successfully maintained as the cavity mode propagates vertically through the DBR waveguide layers. The uniform phase distribution in regions that present strong field intensities ensures that light reflected from a single phase shifter has the same correct phase set by the applied voltage.

FIG. 4C shows the far-field radiation profile of this single element. According to Equation (15)(below), this far-field radiation profile represents the envelope function of the far-field radiation profile of the entire two-dimensional microcavity array. The strongly concentrated field strength at the center indicates that most of the reflected power is distributed to the first few diffraction orders in the far field. This ensures high diffraction efficiency for most applications, where (only) the main diffraction lobe is of interest.

Further mode matching between the free-space mode, which may be, for example, an incident light beam that has a Gaussian mode profile, and the resonator mode can be accomplished by placing a phase mask or a microlens array in front of the two-dimensional microcavity array. The phase mask or microlens array matches the light incident on each phase shifter to the waveguide mode of the input port of each microcavity.

The simulations in FIGS. 4A-4C were done with the finite-difference time-domain (FDTD) method. The parameters used in the simulation are summarized in Table 1. The determination of Pockels coefficient of BTO used in the simulation is discussed in more detail below.

TABLE 1

Parameters used in Simulations

| Parameter | Description | Value |
|---|---|---|
| $n_{SiO2}$ | refractive index of $SiO_2$ | 1.457 |
| $n_{TiO2}$ | refractive index of $TiO_2$ | 2.3893 |
| $n_{BTO}$ | refractive index of BTO | 2.286 |
| $r_{BTO}$ | Pockels coefficient of BTO | 872.01 pm/V |
| $n_{ITO}$ | refractive index of ITO, real part | 1.7522 |
| $k_{ITO}$ | refractive index of ITO, imaginary part | $3.4847 \times 10^{-3}$ |
| d | thickness of the cavity layer | 678 nm |
| $N_{top}$ | number of DBR pairs above the cavity layer | 5 |
| $N_{bottom}$ | number of DBR pairs below the cavity layer | 15 |
| D | width of the vertical microcavity pillar | 5 μm |

BTO Crystalline Orientation

The integration of BTO with the vertical microcavities, thanks to BTO's strong electro-optic (Pockels) effect, allows phase-only modulation of up to $2\pi$ under CMOS-compatible voltages. With a Pockels coefficient $r_{42}$=923 pm/V (in comparison, the largest Pockels coefficient for $LiNbO_3$ is $r_{33}$=32 pm/V), a large refractive index change can occur, which then translates to a substantial phase shift for a moderate applied electric field. Due to the crystalline structure (non-centrosymmetric tetragonal P4 mm) of BTO, the change in the refractive index depends on the direction of the applied electric field. In the vertical microcavity phase shifter, the E field is applied horizontally (in the plane of the BTO's crystalline c-axis) between the two ITO contacts (electrodes).

Figures 5A, 5B, 5C:
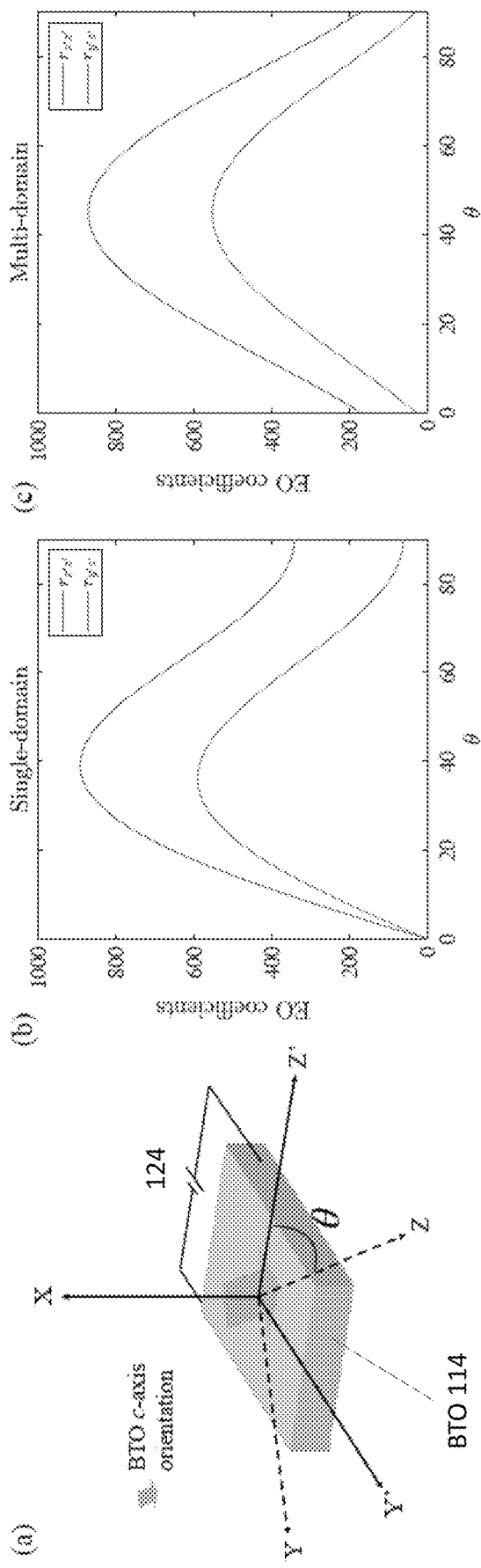
FIG. 5A illustrates the BTO cavity layer, its crystalline orientation, and the direction of the applied electric field (E field).
FIG. 5B is a plot of the magnitudes of the electro-optic coefficients $r_{z'z'}$ and $r_{y'z'}$ as a function of the angle θ between the applied E field and the BTO crystalline c-axis for a single-domain BTO thin film.
FIG. 5C is a plot of the magnitudes of the electro-optic coefficients $r_{z'z'}$ and $r_{y'z'}$ as a function of the angle θ between the applied E field and the BTO c-axis for a multi-domain BTO thin film.

FIG. 5A illustrates the directions of the applied E field (along Z'-direction) and BTO's c-axis orientation (along the Z-direction), which is orthogonal to the pixel's optical axis (the X-direction). The in-plane angle between the applied E field and the c-axis is denoted by $\theta$. Since the BTO cavity layer 114 has a thickness of several hundreds of nanometers, the c-axis of BTO is oriented in-plane. The indicatrix in the crystal's principal-axis coordinate system can be written as $$\left(\frac{1}{n_o^2} + r_{13}E_z\right)x^2 + \left(\frac{1}{n_o^2} + r_{13}E_z\right)y^2 + \\ \left(\frac{1}{n_e^2} + r_{33}E_z\right)z^2 + (r_{42}E_y)2yz + (r_{42}E_x)2zx = 1 \quad (10)$$

where $n_o$ and $n_e$ are the ordinary and extraordinary refractive indices of the crystal, respectively, and $r_{13}$, $r_{33}$, and $r_{42}$ are the non-zero electro-optic coefficients for p4 mm symmetry. The last term equals zero because the E field is applied in-plane and hence $E_x$=0. This equation can be transformed into the X'Y'Z'-coordinate system by substituting x, y, and z by x=x', y=cos $\theta$y'+sin $\theta$z', and z=−sin $\theta$y'+cos $\theta$z'. After some algebra, Equation (10) becomes $$\left(\frac{1}{n_o^2} + r_{13}E_z\right)x'^2 + \\ \left[\left(\frac{1}{n_o^2} + r_{13}E_z\right)\sin^2\theta + \left(\frac{1}{n_e^2} + r_{33}E_z\right)\cos^2\theta + r_{42}E_y \cdot 2\sin\theta\cos\theta\right]z'^2 + \\ \left[\left(\frac{1}{n_o^2} + r_{13}E_z\right)\cos^2\theta + \left(\frac{1}{n_e^2} + r_{33}E_z\right)\sin^2\theta - r_{42}E_y \cdot 2\sin\theta\cos\theta\right] \\ y'^2 + \left[\left(\frac{1}{n_o^2} + r_{13}E_z\right)2\sin\theta\cos\theta - \\ \left(\frac{1}{n_e^2} + r_{33}E_z\right)2\sin\theta\cos\theta + r_{42}E_y \cdot 2(\cos^2\theta - \sin^2\theta)\right] = 1 \quad (11)$$

Setting $E_z$=0 yields:

$$n_{z'} = \frac{n_o n_e}{\sqrt{(\sin^2\theta n_e^2 + \cos^2\theta n_o^2)}} \quad (12)$$

which is the refractive index for light polarized along the Z'-direction. When $\vec{E} = E_z \hat{z}'$, $$\frac{1}{n_{z'}^2}(\vec{E} = E_z\hat{z}') = \frac{\sin^2\theta}{n_o^2} + \frac{\cos^2\theta}{n_e^2} + [(r_{13} + 2r_{42})\cos\theta\sin^2\theta + r_{33}\cos^3\theta]E_{z'} \quad (13)$$

$$= \frac{1}{n_{z'}^2}(\vec{E} = 0) + [(r_{13} + 2r_{42})\cos\theta\sin^2\theta + r_{33}\cos^3\theta]E_{z'}$$

which then indicates that the effective electro-optic coefficient $r_{z'z'}$ for light polarized along the Z'-direction under an E field applied in the same direction is $$r_{z'z'}(\theta) = (r_{13} + 2r_{42})\cos\theta\sin^2\theta + r_{33}\cos^3\theta \quad (14)$$

Similarly, the refractive index $n_{y'}$ and the electro-optic coefficient $r_{y'z'}$ for polarization perpendicular to the E field direction can be obtained using the y'z' term in Equation (13).

FIG. 5B plots the effective electro-optic coefficients $r_{z'z'}$ and $r_{y'z'}$ as a function of the in-plane angle $\theta$ between the applied E field and the BTO c-axis for experimentally measured values of $r_{13}$, $r_{33}$, and $r_{42}$ for BTO thin film. The maximum coefficient occurs at $\theta \approx 40°$ for $r_{z'z'}$. Hence, to increase or maximize the refractive index change for a given applied E field, the polarization of the light should be along the same direction as the applied E field, and the BTO crystal should be oriented such that the c-axis is at a 40° angle with the E field direction in the horizontal plane. When multi-domain BTO thin film is considered, where the c-axis of the rectangular-shaped domains points in one of the two perpendicular in-plane directions, the effective $r_{z'z'}$ and $r_{y'z'}$ are the linear combinations of the EO coefficients for each single domain.

FIG. 5C shows the effective $r_{z'z'}$ and $r_{y'z'}$ for a multi-domain BTO thin film with an equal number of domains pointing in each direction. The maximum coefficient now occurs at $\theta \approx 45°$ for $r_{z'z'}$. To increase or maximize the refractive index change for a given applied E field, the polarization of the light should be along the same direction as the applied E field, and the BTO crystal should be oriented such that the c-axis is at a 45° angle from the E field direction. The maximum effective EO coefficient is $r_{z'z'}$=872.01 pm/V and the refractive index for this orientation is $n_{z'}$=2.286. These parameters are used for simulations throughout this specification.

Spatial Light Modulators with Two-Dimensional Tunable Microcavity Arrays

The spatial light modulator illustrated in FIG. 1B includes a two-dimensional array of vertical microcavities on top of a CMOS substrate. Each vertical microcavity pixel is a free-space phase modulator that works in the reflection mode, as explained above, allowing incident light to be reflected with a phase delay controlled by an independent electrical voltage applied through the metal interconnect contacts in the CMOS substrate. The 2D array of vertical microcavities, when controlled independently and simultaneously, can impose a spatially variant phase distribution on the wave front of the reflected light, which can then generate a far-field radiation pattern according to $$U(x, y, z) = \int_{-\infty}^{\infty} \int_{-\infty}^{\infty} A(f_x, f_y, 0) e^{j2\pi \sqrt{\frac{1}{\lambda^2} - f_x^2 - f_y^2}} e^{j2\pi(f_x x + f_y y)} df_x df_y \quad (15)$$
$$= U_1(\theta, \phi, z) F_a(\theta, \phi, z)$$

where $U(x, y, z)$ is the far-field radiation field of the reflected light from the SLM, $A(f_x, f_y, 0)$ is the Fourier transform of the near-field radiation field of the reflected light as a function of the spatial frequencies $f_x$ and $f_y$, $U_1(\theta, \phi, z)$ is the far-field radiation field of a single pixel, $F_a(\theta, \phi, z)$ is the array factor of the system, and $\lambda$ is the wavelength of light.

The far-field profile of the SLM includes light reflected into a number of diffraction orders. The polar and azimuthal angles of the diffracted light are determined by the pixel pitch of the SLM. If there are many pixels in the SLM, there should be negligible overlap of different diffraction orders. The field distribution within each diffraction order can be controlled by the spatial phase distribution of the wave front reflected from the pixels. Using a phase retrieval algorithm, such as the Gerchberg-Saxton algorithm, the desired phase from each pixel can be calculated and set by the corresponding control voltage, allowing an arbitrary far-field pattern to be generated in each diffraction order. The power distribution of light reflected into each diffraction order is determined by the single pixel far-field pattern $U_1(\theta, \phi, z)$, which can be thought of as an "envelope" function.

Dynamic Beam Steering and Beam Shaping

A phase-only SLM with phase shifters arranged in a large-scale one- or two-dimensional array can be used for dynamic beam steering and beam shaping. Dynamic, one- or two-dimensional, continuous beam steering can be achieved by assigning a phase profile to the phase shifter array that represents a phase gradient in the steering direction $$\frac{d\phi}{dx} = \frac{2\pi}{\lambda} \sin(\theta_r) \quad (16)$$

where $\phi$ is the phase of the reflected light, x is the spatial coordinate along the steering direction, and $\theta_r$ is the reflection angle of the reflected light.

FIGS. 6A and 6B show a simulation of the continuous beam steering by a phase-only SLM like the one in FIG. 1B. FIG. 6A is a plot of the intensity of the E field $|E|^2$ in the far-field versus angle (x axis) and phase gradients $d\phi/dx$ from $0.2\pi$ to $\pi$ (y axis). FIG. 6B shows line-cuts from FIG. 6A representing $d\phi/dx=0.35\pi$ and $d\phi/dx=0.85\pi$. The peaks in the far-field intensity correspond to diffraction orders due to a pixel pitch a=5.2 μm of the phase shifter array that is larger than the wavelength of incident light λ=1550 nm. Power diffracted to the second or higher orders is negligible. No unsteered beams ("ghost spots") remain at 0 phase gradient diffraction locations. This is a result of the individual phase shifters' phase-only modulation capability, which contributes to the high diffraction efficiency of the SLM.

The far-field intensity profile in FIG. 6A was calculated by first sampling the simulated near-field profile of each phase shifter above the Nyquist limit, then combining the individual profiles to form a large-scale profile of the 2D array, and finally analytically propagating the near-field profile to the far field using the Angular Spectrum Method. The simulated near-field profile of the individual phase shifter is sampled at 45 discrete phase levels in an index change range of Δn=0.06. In this simulation, the SLM has a 20×20 two-dimensional array of phase shifters with a pixel pitch a=5.2 μm. Negligible coupling between the individual phase shifters is confirmed by checking that the FDTD-simulated far-field profile agrees with the analytical far-field profile calculated with Angular Spectrum Method.

FIGS. 7A-7C show dynamic tuning of the focal length of a dynamically tunable varifocal lens implemented with a phase-only SLM like the one in FIG. 1A. They are plot of the reflected light with lens focal lengths of $f_0$=250 μm, $f_0$=500 μm, and $f_0$=750 μm. This dynamically tunable varifocal lens can be achieved by assigning a phase profile to the phase shifter array that follows a hyperbolic relation $$\phi(x, y) = \phi(0, 0) + \frac{2\pi}{\lambda}\left(f_0 - \sqrt{x^2 + y^2 + f_0^2}\right) \quad (17)$$

where $\phi(0,0)$ is the reflected phase of the center pixel and $f_0$ is the focal length of the lens. Phase profiles that correspond to different focal lengths can be dynamically assigned to the SLM pixels. The reflected light can then be focused at different distances from the SLM surface by adjusting the phase profile.

Vertical Microcavities with Microlens Arrays for Lateral Optical Confinement

FIGS. 8A and 8B show alternative SLMs with electro-optic layers in one-sided Fabry-Perot cavities and lateral confinement provided by integrated microlenses instead of by patterning the cavities into laterally separated micropillars. Using microlenses instead of laterally separated micropillars for lateral confinement reduces the manufacturing complexity.

The SLM 800 in FIG. 8A includes a BTO layer 814 that is either one wavelength or one-half wavelength thick sandwiched between a lower DBR 812 and an upper DBR 816. The upper DBR 816 has a lower reflectivity than the lower DBR 812, making the cavity formed between them asymmetric or one-sided like the cavities in the SLM pixels 110 of FIGS. 1A and 1B. For example, the upper DBR mirror 816 may have a reflectivity $R_{top}\approx0.9$, the BTO layer 814 may be about one wavelength thick ($\lambda_0/n_{BTO}\approx290$ nm for $\lambda_0$=633 nm), and the bottom DBR 812 may have a reflectivity $R_{bott}\gg R_{top}$, which yields an over-coupled optical cavity with a quality factor Q≈400. This ensures that the cavity mode is over-coupled into free space. The low-index DBR material may surround the cavity to comply with the BTO fabrication and transfer process.

The SLM 800 also includes an anti-reflection-coated microlens array 830 that converts an incident plane wave 801 into an array of localized cavity modes within the wavelength-thick BTO layer 814. The microlens array 830 provides lateral confinement by focusing the incident light, which eliminates the need to define individual pillars, with each lens 832 in the microlens array 830 defining a corresponding pixel 810 in the SLM 800. The SLM pixel pitch is given by the microlens pitch, which may be about 10 μm.

FIG. 8B shows an SLM 850 with a microlens array 880 embedded in the cavity. In this case, the microlens array 880 is between the BTO layer 814 and an upper DBR reflector 866, which is deposited on the microlens array's upper (curved surface). Again, the lenses 882 in the microlens array 880 confine the incident light 851 laterally within the cavity, defining individually addressable pixels 860 whose pitch equals the pitch of the microlens array 880.

The pixels 810 and 860 in the SLMs 800 and 850 of FIGS. 8A and 8B are addressed with electrodes 820, 822, and 824 deposited on the BTO layer 814 and under the lower DBR 812. The electrodes 820 on the BTO layer 814 and the electrodes 822 under the lower DBR 812 are grounded. The other electrodes 824 under the lower DBR 812 are coupled to respective voltage sources V. Turning on one of these voltage sources produces an electric field aligned roughly in the plane of the BTO layer 814 (i.e., orthogonal to the pixel's optical axis/propagation vector of the incident light 801 and 851) over the corresponding pixel 810, 860. Electrically actuating the individual pixels 810, 860 produces fast (e.g., GHz-rate) spatial light modulation and beam steering.

The design shown in FIG. 8A enables a simple electrode configuration with two layers of electrodes: a common ground layer above the BTO and a signal layer below the bottom DBR addressed by the CMOS circuit on the substrate. In this design, ground plates are added in each pixel to screen out electric fields from the neighboring pixels. In this way, the embedded electrodes that complicate the manufacturing process and compromise the reliable deposition of the DBR and BTO layers can be eliminated.

Since no confinement mechanism is embedded within the cavity, the maximum propagation length of light $L_{max}$ within the BTO layer 814 (to prevent coupling into neighboring pixels 810, 860) is approximately limited to the Rayleigh range of the incident light 801, 851, which scales as $d_{pixel}^2$ for a pixel diameter $d_{pixel}$. The electric field E for a given voltage is inversely proportional to $d_{pixel}$, so the optimum half-wave voltage $V_\pi^{opt} \ni 1/L_{max}E$ to produce a $\pi$-phase shift of the incident light is also inversely proportional to $d_{pixel}$. Specifically, using perturbation theory and optimizing the microlens focal length gives:

$$V_\pi^{opt} = \left(\frac{4}{\pi^2 n_{BTO}^2 r_{BTO} \Gamma_c}\right) \frac{1}{\tilde{d}_{pixel}} \quad Q_{max} = \left(\frac{\pi^2}{2}\right) \tilde{d}_{pixel}^2,$$

where $r_{BTO}$ and $n_{BTO}$ are the Pockels coefficient and index of BTO, respectively, $\Gamma_c$ is the confinement factor of the cavity mode within BTO, $Q_{max} = 2\pi \tilde{L}_{max}$ is the corresponding maximum cavity quality factor, and the tilde overscript indicates wavelength-normalized variables. For an infinite 2D cavity and high-reflectivity DBR mirrors, we can use distributed feedback theory to approximately evaluate the longitudinal confinement factor $$\Gamma_c \approx \frac{1}{1 + \frac{\langle n_B \rangle}{\Delta n_B}}$$

for a spatially averaged DBR index $\langle n_B \rangle$ with an index contrast $\Delta n_B$ between high- and low-index layers. Assuming a common DBR configuration of alternating SiO$_2$ (n=1.46) and TiO$_2$ (n=2.39) layers, $\Gamma_c \approx 0.34$, indicating that reasonable overlap with the BTO is achievable.

Finally, for an over-coupled optical cavity where the dominant loss mechanism is leakage through the top DBR mirror, the top mirror's resonant reflectivity $R_{top}$ is related to $Q_{max}$ as $$R_{top} \approx 1 - \frac{4\pi L_{eff} \langle n_g \rangle}{Q_{max} \lambda_0} = 1 - \frac{4(n_{BTO} + 2\Delta n_B)\langle n_g \rangle}{\pi \Delta n_B n_{BTO} \tilde{d}_{pixel}^2}$$

for a spatially averaged group index $\langle n_g \rangle$ and effective cavity length $L_{eff}$, which accounts for finite penetration of the mode into the DBR.

FIG. 9A shows the normalized beam radius as a function of the cavity's quality factor (Q=2πL for an intracavity propagation length L normalized to the resonant wavelength) and the microlenses' radius of curvature (corresponding to a lens focal length f and numerical aperture NA) for different pixel sizes in the SLM 800 of FIG. 8A. It illustrates the design considerations for the SLM 800, in particular the tradeoff between the cavity's quality factor and the focus of microlens arrays 830. In the optimal operation regime, the cavity's quality factor is high enough to enable low-voltage operation of the SLM 800 but not so high that diffraction causes the beam to escape the cavity. The microlenses' numerical apertures are large enough to confine the beam laterally and to reduce or minimize the inter-pixel coupling but not so high that the beam diffracts and diverges too quickly to be confined in the cavity. FIG. 9B is a plot of the intensity profile of for the SLM 800 with a pixel width of $d_{pixel}$=10κ.

FIG. 10 is a plot of a simulated horizontal electric field profile for the electrodes 820 in the SLM 800 of FIG. 8A. For thin film epitaxial BTO with the tetragonal c-axis in plane, the electric fields should be applied horizontally to achieve maximum refractive index change under the same applied voltage. Typically, electrodes 820 should be embedded in the same plane as the BTO thin film 814 for generation of a localized horizontal electric field to independently control each pixel 810 without crosstalk.

FIG. 11 shows analytic approximations for optimum half-wave voltage $V_\pi^{eff}$ and top mirror reflectivity $R_{\lambda_0}$ as a function of pixel diameter $d_{pixel}$ normalized by wavelength for the SLM in FIG. 8A with $\lambda_0$=633 nm, $r_{BTO}$=872 pm/V, $n_{BTO}$=2.29, DBRs formed with alternating SiO$_2$/TiO$_2$ layers, and $\langle n_g \rangle$=2.69 (assumed equal to the bulk BTO value at $\lambda_0$). The effective half-wave voltage assumes that the electric field lies exactly in-plane with the BTO. In a realistic design, however, placing the electrodes above or below the BTO may reduce the transverse electric field in the BTO. The half-wave voltages plotted in FIG. 11 are therefore "best-case" values.

The results in FIG. 11 indicate that a design pixel size of $d_{pixel} \approx 15\lambda$, gives an optimum half-wave voltage $V_\pi^{opt}$ 10 V and a reasonable top mirror reflectivity $R_{\lambda_0}$<0.99. For the bandwidth of the DBR to cover the entire resonance, the quality factor should be $Q \gg \langle n_B \rangle / \Delta n_B \approx 2$, which is easily satisfied for a cavity with $Q_{max} \approx 10^3$.

The "cavity unfolding" technique employed for these theoretical approximations—which assume that the DBR mirrors perfectly preserve the optical mode shape upon reflection—is imperfect due to non-idealities associated with the DBR mirrors and microlenses. Nevertheless, the theory results are useful for guiding the selection of desired cavity parameters for use in a fully vectorial FDTD simulation.

The simulated cavity includes a near-perfect bottom DBR mirror, a half-wavelength thick BTO thin film, a partially reflecting top DBR mirror, the substrate for the microlens array, the microlens array itself (with spherical surfaces), and an anti-reflection coating above the microlens array.

FIGS. 12A-12C illustrate performance of the target design, with parameters used in the simulation summarized in TABLE 1. The near field intensity and phase profiles above the microlens surface, illustrated in FIG. 12A, show that the majority of the emission from the cavity has a nearly uniform phase front. The mode profile shown in FIG. 12B indicates lateral confinement of the cavity mode enabled by the microlens array on top. The reflection spectrum of the cavity array in FIG. 12C shows that the cavity array is over-coupled with the free-space mode, resulting in a close to unity amplitude reflection response and a $2\pi$ phase change across the cavity resonance. The quality factor of the cavity mode is approximately 330 (a factor of ~3 less than the estimate theoretical optimum).

FIGS. 13A and 13B show FDTD simulations of the target design for the planar reflector-based microcavity array in FIG. 8A. FIG. 13A shows reflection amplitude spectra of the microcavity array for different BTO refractive indices. FIG. 13B shows reflection amplitude and phase at a wavelength of $\lambda=637$ nm as a function of the refractive index change $\Delta n$ of BTO and the corresponding effective voltage $V_{eff}$. As the refractive index of the BTO thin film is changed through electrical actuation, the cavity resonance shifts, as illustrated in FIG. 13A. This changes the reflection amplitude and phase at the cavity resonant wavelength $\lambda=637$ nm, which are shown in FIG. 13B. The cavity quality factor of approximately 330 corresponds to a $V_\pi$ of 40 V.

TABLE 1

Parameters used in FDTD simulation.

| Parameter | Description | Value |
| --- | --- | --- |
| $\lambda_d$ | Design wavelength | 633 mm |
| $n_{SiO2}$ | Refractive index of $SiO_2$ | 1.457 [5] |
| $n_{TiO2}$ | Refractive index of $TiO_2$ | 2.3893 [5] |
| $n_{BTO}$ | Refractive index of BTO (E field applied in-plane, at 40°) | 2.289 [3] |
| $r_{eff}$ | Effective Pockels coefficients of BTO (E field applied in-plane, at 40°) | 892.80 pm/V [3] |
| d | Thickness of the cavity layer | 138.3 nm |
| $N_{top}$ | Number of pairs of DBRs above the cavity layer | 5 |
| $N_{bottom}$ | Number of pairs of DBRs below the cavity layer | 8 |
| D | Width of the vertical microcavity pillar | 10 μm |
| ROC | Radius of curvature of microlens | 15 μm |
| $d_{spacer}$ | Thickness of the microlens substrate | 3 μm |

Table 1 lists suitable design parameters for an example cavity. Table 2 outlines the desired sample contents and corresponding measurements to be performed with the sample.

Vertical Microcavities with Defects for Lateral Optical Confinement

The micropillar SLM 100 in FIGS. 1A and 1B operates with a voltage of 9.3 V to modulate the reflected phase from 0 to $\pi$. This is a significant increase in the phase shift compared to that provided by a Pockels thin film of the same thickness without microcavity amplification. However, it is challenging for standard high-speed CMOS transistor backplanes to provide driving voltages that are higher than 5 V.

One way to reduce the driving voltage with the same Pockels materials and coefficients is to increase the loaded quality factor of the microcavity and decrease the width across which the electric field is applied. The loaded quality factor $Q_{tot}$ of the microcavity is upper-bounded by the microcavity's intrinsic quality factor $Q_{int}$ by $$Q_{tot} \le \frac{1-\sqrt{R_0}}{2}Q_{int}$$

where $R_0$ is the reflectivity of the microcavity at the resonant wavelength. This implies that increasing the cavity's intrinsic quality factor increases the loaded quality factor.

The cavity's intrinsic quality factor, defined as the quality factor of the cavity where both the upper and lower DBRs have infinite reflectivity, is determined by the transverse scattering loss due to the small lateral size of the vertical cavity. This can be understood from a perspective of a spatial Fourier transform of the mode profile of the microcavity. When the mode is highly confined in the spatial domain in the (x, y)-direction, the wave-vector components $(k_x, k_y)$ are not well-confined, leading to light waves escaping from the cavity and degrading the cavity quality factor.

The driving voltages of the SLMs shown in FIGS. 8A and 8B are limited by the lack of a lateral confining mechanism within the cavity. To further increase the cavity quality factor without etching the cavity into micropillars, the microlens arrays can be replaced by internal defects (e.g., mesa, Gaussian, or bullseye defects). These internal defects confine the field laterally without significantly impacting the overlap between the cavity mode and the center BTO layer. SLMs with internal defects can have low half-wave voltages $V_\pi$ and high cavity fill factors (the ratio of optical mode area to pixel area at the input aperture, which directly affects diffraction efficiency).

FIGS. 14A and 14B show an SLM 1400 with a one-sided vertical cavity geometry where a Gaussian-shaped index

TABLE 2

Relevant parameters for device fabrication.

| Parameter | Desired Value | Notes |
| --- | --- | --- |
| Sample Size | 1 cm × 1 cm | to allow sufficient area for final ~100 × 100 pixel device and handling; can be modified if another size is easier for IBM |
| Top DBR Reflectivity $R_{top}$ | 0.90 (minimum; up to 0.99 for variable-Q cavities) | sim. assumes air/(5 pairs of $TiO_2/SiO_2$)/Si |
| Top DBR Center Wavelength | 633 nm | bandwidth >> cavity linewidth (~1 nm) |
| Bottom DBR Reflectivity $R_{bot}$ | >> $R_{top}$ (0.99999 in simulation) | sim. assumes air/(12 pairs of $SiO_2/TiO_2$)/Si |
| Bottom DBR Center Wavelength | 633 nm | bandwidth >> cavity linewidth (~1 nm) | perturbation, or defect 1430, confines the mode in the lateral direction. This can be achieved by lithographically patterning a resist layer above the active material followed by a thermal reflow of the resist and a subsequent etching step to transfer the shape to the active material. Each defect 1430 defines a corresponding pixel 1410 in the SLM 1400. The defects 1430 can be arranged in a one- or two-dimensional array (e.g., a two-dimensional rectilinear array) to create a one- or two-dimensional array of pixels for the SLM 1400. The defect pitch (and hence the pixel pitch) can be constant or fixed and can 1.5 µm, 2.0 µm, 2.5 µm, 3.0 µm, or higher, with the defects themselves having widths of 0.5 µm, 0.75 µm, 1.0 µm, 1.25 µm, or higher. The array can be full or sparse, depending on the desired performance and application.

The SLM 1400 also includes an electro-optic layer 1414, such as a layer of BTO, between a high-reflectivity DBR 1412 and a lower-reflectivity DBR 1416 like the ones described above. The DBRs 1412 and 1416 above and below the active material layer 1414 confine the optical mode 1401 in the vertical direction. Electrodes 1420 above or below the active material layer 1414 apply an electric field in the plane of the active material layer 1414. For an active material layer 1414 made of BTO, the BTO's crystalline c axis may also be in the plane of the active material layer 1414 as shown in FIG. 5A. That is, both the electric field and the crystalline c axis may be perpendicular the optical axis of the SLM 1400.

FIG. 14B shows the SLM's CMOS backplane 1440 in greater detail. The contacts 1420 connect to metal interconnects 1422 that extend through an oxide layer 1442 to an n-silicon layer 1446. Each pixel 1410 may be coupled to and controlled by a separate transistor 1446 via the contacts 1420 and interconnects 1442. (In FIG. 14B, the pixels 1410 are patterned into micropillars for connecting the electrodes 1420 to the metal layers 1422 in the CMOS backplane 1440, though they don't have be patterned so long as the contacts 1420 can be coupled to the transistors 1446 through the unpatterned layers.)

Each pixel 1410 may have an intrinsic quality factor of up to $10^5$ even when the width of the defect 1430 is well below 1 µm. In contrast, the intrinsic quality factor of the micropillar vertical cavity 110 in FIGS. 1A and 1B drops to below 100 when the micropillar vertical cavity's width becomes smaller than 1 µm.

FIGS. 15A-15C are plots of simulated intrinsic quality factors of vertical microcavities whose lateral optical confinement is provided by defects of different heights h0 with mesa, spherical, and Gaussian shapes. The Gaussian-shaped defects have higher cavity intrinsic quality factors than defects with mesa and spherical shapes.

With the higher intrinsic quality factor, the upper bound of the loaded quality factor can be elevated. At the same time, since this high intrinsic quality factor is maintained even when the defect width becomes less than 1 µm, the same driving voltage can induce a stronger electric field thanks to a shortened voltage drop distance, leading to a larger refractive index change and a lowered minimum quality factor $Q_{min}$. The net result of this expanded range of possible loaded quality factors is that a design with CMOS-compatible driving voltage is possible in the phase-only modulation regime with Pockels effect.

FIGS. 16A-16C show a quality factor analysis of the Gaussian-defect vertical cavity in FIG. 14 for different defect widths. FIG. 16A shows maximum loaded quality factor $Q_{max}$ (solid traces) and minimum loaded quality factor and $Q_{min}$ (dash traces) loaded quality factor for the reflectance to be greater than the values in the legend and for the voltage required to achieve a π phase shift to be less than the values in the legend. FIG. 16B shows maximum and minimum loaded Q for the reflectance to be greater than 0.9 and for the half-wave voltage to be less than 2 V. FIG. 16C is a simulation of cavity loaded quality factor for different defect widths w and numbers of $TiO_2/SiO_2$ quarter-wavelength pairs $N_{top}$. For w=600 nm and $N_{top}$=7, the reflectance can be maintained above R=0:9 and the voltage for a π phase shift is <2V.

FIG. 17 is a plot of the modulation characteristics of a Gaussian-defect vertical microcavity phase shifter element with design parameters D=600 nm and Ntop=7. It shows that the reflectance amplitude is R>0.9 across the modulation range, and the voltage to reach a π phase shift is $V_\pi$<2 V, which is standard-CMOS-compatible. These values agree well with the prediction from the quality factor analysis performed above.

Guided Mode Resonator-Based SLMs

FIG. 18 shows an infrared or visible SLM 1800 formed by covering a thin barium titanate layer 1820 with a patterned film 1810 of silicon or silicon nitride, respectively. An underlying CMOS electrode array 1830 patterns a spatially varying electric field (applied horizontally in plane with the crystalline c-axis to maximize the electro-optic response), which is effectively transduced to local optical phase shifts by a well-confined, moderate-Q guided mode resonance. This phase shift is a result of the change in BTO refractive index, which shifts the center wavelength of the guided mode resonance since the energy of this resonance overlaps with the Pockels material. This SLM 1800 operates without thick dielectric mirrors that can limit the achievable tuning efficiency. It enables near-perfect extinction ratios of reflected light with reasonable voltages applied to arbitrarily configured electrodes.

Guided mode resonators (GMRs) provide modest quality factors, can be formed with a defect-free PhC lattice, and are vertically coupled. Since the high Pockels coefficient of BTO enables linewidth-order resonances shifts with low quality factors (e.g., Q~100), GMRs are a promising solution for spatial light modulation. Specifically, BTO's strong, electric field-based index modulation overcomes the large pixel pitch and limited tuning range of weaker thermal and free carrier modulation techniques. Compared to the vertical Fabry-Perot resonator arrays described above, the vertical and lateral confinement of the GMR allow higher-Q resonators to be formed without thick dielectric mirrors.

The parameters of the GMR SLM 1800 illustrated in FIG. 18 can be selected via FDTD simulation to vary the index tuning performance. In this example, the SLM includes a patterned Si (n=3.47) or $Si_3N_4$ (n=2.04) PhC layer on a 200 nm-thick BTO (n=2.29) layer supported by a few micron-thick underlying oxide. The patterned layer thickness t, square lattice constant a, and hole ratio r/a for the PhC layer were selected via successive global and local nonlinear optimization to increase quality factor and surface-normal reflection modulation contrast at a design wavelength ($\lambda_0$=1550 nm for Si, $\lambda_0$=633 nm for $Si_3N_4$). For the silicon GMR SLM, the final parameters are: $t_{Si}$=150 nm, a=0.88 µm, r/a=0.12, $\lambda_0$≈1550 nm, γ≈0.23, Q≈420. For the silicon nitride GMR SLM, the final parameters are: $t_{Si}$=120 nm, a=0.42 µm, r/a=0.25, $\lambda_0$≈630 nm, γ≈0.41, Q≈1900. While this design provides amplitude modulation, phase modulation is feasible with a similar geometry.

FIGS. 19A and 19B show the reflection spectra and design parameters obtained via this FDTD optimization process. The confined modes exhibit large overlap with BTO (confinement γ ranging from −20-40%) and produce Fano reflection profiles due to interference between the direct reflection of incident light and vertical cavity leakage. Combined, these characteristics allow for efficient modulation of the reflection coefficient between zero and unity (corresponding to a>>20 dB extinction ratio) with an achievable BTO index perturbation $|\Delta n|<0.01$.

These SLMS can be controlled with an arbitrarily configured underlying electrode array. However, the achievable spatial resolution may be limited by the quality factor (e.g., to a few microns for achievable quality factors), as a longer storage time equates to a larger transverse propagation distance. The pixel size of this spatially distributed resonant mode (e.g., on the order of a few wavelengths) limits beam steering to a numerical aperture comparable to that of the microlens-based cavities. Regardless, a GMR SLM can used as a GHz-rate alternative to a conventional digital micromirror device.

Phase Masks for Higher SLM Fill Factors

The diffraction efficiency of an SLM is directly related to the fill factor of each pixel's near-field profile. However, the pixel fill factor may be limited because: (1) the laterally confined nature of the microcavity's optical mode can confine the near field profile; (2) due to the anisotropic nature of the Pockels material (e.g., BTO), the electric field is applied horizontally, implying that the electrodes should be in the same plane as the active material and occupy some area of the pixel; and/or (3) optical coupling and cross-talk between neighboring pixels can influence the phase relationship between those pixels. To ensure independent addressing, the pixels should be far enough apart to prevent significant optical coupling.

FIG. 20 shows how inserting a static phase mask 2000 a short distance above the near field of the pixels 1410 can increase the fill factor and subsequently the diffraction efficiency of the SLM 1400. (This phase mask 2000 can be used with any of the SLMs disclosed here.) This phase mask 2000 converts the limited fill factor at the pixel near field to an almost unity fill factor without compromising the intended phase pattern of the SLM 1400.

As shown in FIG. 20, the optical mode 1401 coupled out from each phase shifter pixel 1410 starts out with a small factor. The outgoing wave propagates a short distance from the pixel surface (at $z_1$). The optical mode 1401 expands laterally due to diffraction to fill up the full pixel at $z_2$. From $z_1$ to $z_2$, the optical waves from neighboring pixels 1410 do not interfere, hence their phase relation at $z_2$ is the same as it is in the near field, where it is controlled by each pixel's voltage. However, the wave front curvature of the optical mode 1401 emitted by each pixel 1410 increases with propagation distance due to the diffraction, which means that at the plane $z_2$, each pixel has a high fill factor, but the phase is nonuniform. This curved wave front would lead to an envelope of the far-field radiation that has a broad angular range. Multiple diffraction orders within this envelope then degrades the diffraction efficiency.

The phase mask 2000 transforms this curved wave front into a flat(ter) wave front by compensating the phase difference due to diffraction within each pixel 1410. This means that a high fill factor can be realized at the same time as a flat wave front and the desired phase pattern set by the pixels 1410. This yields a far-field radiation envelope with smaller angular range and a higher power fraction that is diffracted into the 0th diffraction order.

The phase profile of the phase mask 2000 can be obtained using the following process: (1) simulate the out-coupled microcavity mode 1401; (2) propagate this mode 1401 to the location of the mask $z_2$; (3) calculate the phase of the optical field at this location (the $z_2$ plane); and (4) use the inverse of the phase profile calculated in (3) as the phase profile of the phase mask 2000. Since there is no interference of waves during the propagation between the near field and the phase mask 2000, the phase extracted (3) accurately represents the phase curvature within each pixel 1410. Assuming that the phase profile of the microcavity near field remains the same for different modulated phase settings (which is true for single-mode microcavities under consideration here), the same phase mask 2000 correctly converts the wave front when the phase shifter pixel 1410 is set to a different phase value. In other words, a static phase mask 2000 can perform fill factor conversion even when the phase shifter pixels 1410 are modulated dynamically.

Figure 21A:
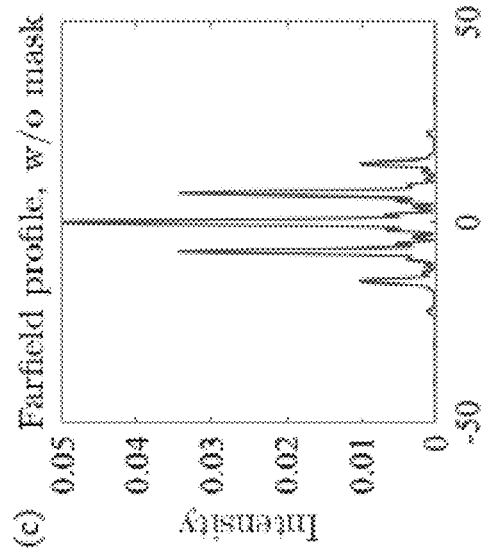
Figure 21B:
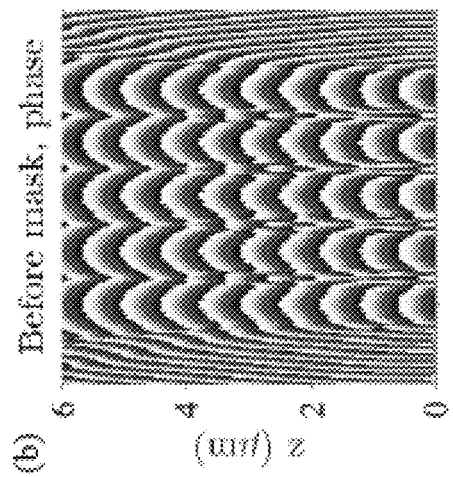
Figure 21C:
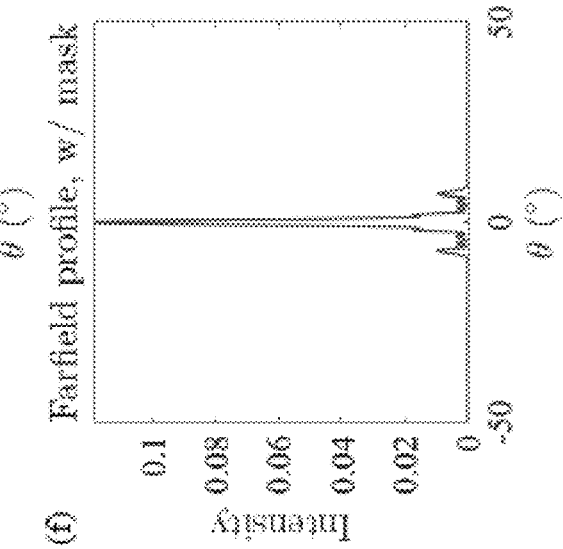

FIGS. 21A-21F are plots of simulations of the effect of the phase mask 2000 shown in FIG. 20. FIGS. 21A and 21B show the amplitude and phase, respectively, of the out-coupled microcavity mode during propagation from the near field to the phase mask, where the near field is sampled from the FDTD simulated profile of each phase shifter. This propagation shows the increase of the fill factor and the curving of the wave front. FIG. 21C shows the far field profile of the SLM array without the phase mask, showing the presence of several diffraction orders.

Figure 21D:
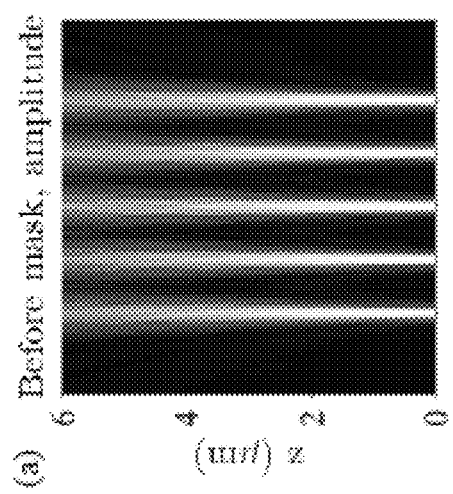
Figure 21E:
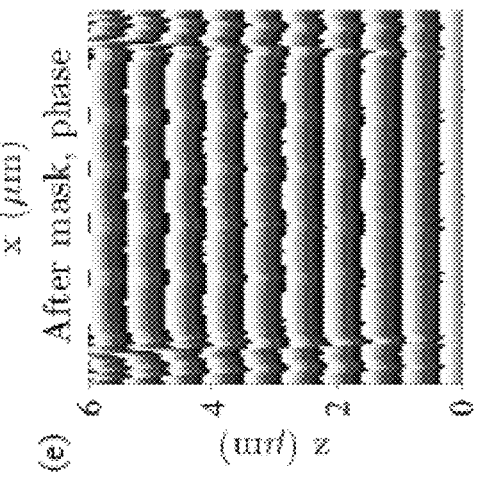
Figure 21F:
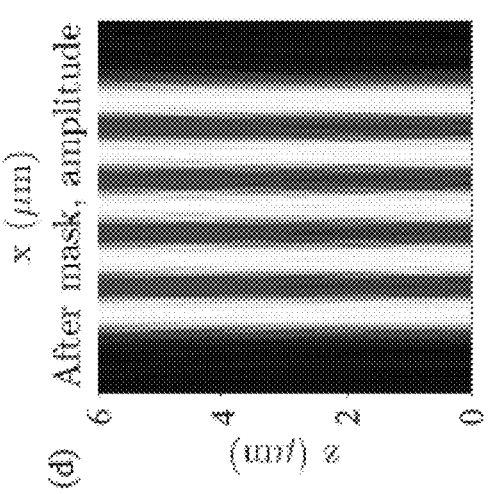

If the phase mask is inserted at $z_2$=6 μm to reduce the wave front curvature, the optical waves after the phase mask should resemble those in the near field with almost unity fill factor with a flat phase within each pixel, as shown in FIGS. 21D and 21E. The resulting far field profile of this SLM array with the phase mask, plotted in FIG. 21F, shows primarily the 0th order diffraction peak with a very small amount of power diffracted to the ±1st orders.

FIGS. 22A and 22B illustrate simulated dynamic continuous far-field beam steering of an SLM with a static phase mask, showing enhanced diffraction efficiency. FIG. 22A shows the far field without the phase mask, while FIG. 22B shows the far field with the phase mask. By assigning a phase profile to the shifter array that represents a phase gradient in the steering direction, the beam is scanned to different angles in the far field.

Again, without the phase mask, the small fill factor leads to several diffraction orders in the far field, and with the mask, the enhanced fill factor significantly suppresses power in higher diffraction orders and redirects that power into the 0th order peak, leading to higher diffraction efficiency. This dynamic beam steering simulated using the static phase mask, obtained according to the procedure outlined above, confirms that this phase correction of a dynamically modulated surface can be done with a passive, static phase mask.

The total SLM efficiency can be calculated by considering the diffraction efficiency from the out-coupled mode to the far-field diffraction order of interest, combined with the in-coupling efficiency from the incoming plane wave to the phase shifter pixels:

(Total SLM efficiency)=(In-coupling efficiency)× (Diffraction efficiency).

Due to reciprocity, an incident plane wave passing through the phase mask with the curved phase profile should focus the plane wave onto each of the phase shifter pixels. This increases the in-coupling efficiency compared to the case where a large amount of the plane wave is incident on the empty space between the pixel's active areas.

FIGS. 23 and 24 illustrate in-coupling for an SLM with a phase correction mask. FIG. 23 shows simulated propagation of an incoming plane wave after passing through the phase mask. And FIG. 24 shows a comparison of the incoming wave's spatial amplitude (top) and phase (bottom) profiles with the microcavity's mode profile.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of," or "exactly one of." "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A spatial light modulator comprising:
an array of phase shifters to modulate light incident on the spatial light modulator, each phase shifter in the array of phase shifters comprising:
a Fabry-Perot resonator to reflect a corresponding portion of the light in a first direction;
a layer of electro-optic material, in a cavity of the Fabry-Perot resonator, to shift a phase of the corresponding portion of the light reflected by the Fabry-Perot resonator; and
a pair of electrodes, in electrical communication with the layer of electro-optic material, to generate an electric field in a second direction orthogonal to the first direction, the electric field modulating a real part of a refractive index of the electro-optic material,
wherein the layer of electro-optic material comprises a single-domain barium titanate crystal with a crystalline c axis oriented at an angle of about 40 degrees with respect to the second direction in a plane orthogonal to the first direction.

2. The spatial light modulator of claim 1, wherein each phase shifter in the array of phase shifters is configured to modulate the phase of the corresponding portion of the light independently of an amplitude of the incident light.

3. The spatial light modulator of claim 1, wherein the array of phase shifters has a pitch of about 5 µm.

4. The spatial light modulator of claim 1, wherein each phase shifter in the array of phase shifters has a width equal to or less than about 5 µm.

5. The spatial light modulator of claim 1, wherein each phase shifter has a half-wave voltage $V_\pi$ of less than about 10 Volts.

6. The spatial light modulator of claim 1, wherein each phase shifter is configured to shift the phase of the incident light over a range from 0 radians to $2\pi$ radians.

7. The spatial light modulator of claim 1, wherein each Fabry-Perot resonator is an asymmetric Fabry-Perot resonator.

8. The spatial light modulator of claim 1, wherein each Fabry-Perot resonator has a loaded quality factor $Q_{tot}$ of $$\left(\frac{\Delta n}{n_0}\frac{U_{BTO}}{U_{tot}} + \frac{2}{Q_{int}}\right)^{-1} \leq Q_{tot} \leq \frac{1-\sqrt{R_0}}{2} Q_{int},$$

where $\Delta n$ is a change in the real part of the refractive index of the layer of electro-optic material, $n_0$ is the refractive index of the layer of electro-optic material without an applied electric field, $(U_{BTO}/U_{tot})$ is a fraction of energy in the layer of electro-optic material, $Q_{int}$ is an intrinsic quality factor of the Fabry-Perot resonator, and $R_0$ is a reflectance on resonance of the Fabry-Perot resonator.

9. The spatial light modulator of claim 1, wherein each Fabry-Perot resonator comprises a quarter-wavelength layer of $TiO_2$ on a distributed Bragg reflector comprising alternating quarter-wavelength layers of $TiO_2$ and $SiO_2$.

10. The spatial light modulator of claim 1, wherein each phase shifter in the array of phase shifters forms a micropillar.

11. The spatial light modulator of claim 1, further comprising:
an array of microlenses in optical communication with the array of phase shifters, wherein each microlens in the array of microlenses is configured to focus the incident light to a spot within the layer of electro-optic material in a corresponding phase shifter.

12. The spatial light modulator of claim 11, wherein the array of microlenses is disposed on the array of phase shifters.

13. The spatial light modulator of claim 11, wherein each microlens in the array of microlenses is disposed within the Fabry-Perot resonator of the corresponding phase shifter.

14. The spatial light modulator of claim 1, wherein each phase shifter in the array of phase shifters comprises a refractive index perturbation configured to confine the incident light laterally within that phase shifter.

15. A spatial light modulator comprising:
an array of phase shifters to modulate light incident on the spatial light modulator, each phase shifter in the array of phase shifters comprising:
a Fabry-Perot resonator to reflect a corresponding portion of the light in a first direction;
a layer of electro-optic material, in a cavity of the Fabry-Perot resonator, to shift a phase of the corresponding portion of the light reflected by the Fabry-Perot resonator; and
a pair of electrodes, in electrical communication with the layer of electro-optic material, to generate an electric field in a second direction orthogonal to the first direction, the electric field modulating a real part of a refractive index of the electro-optic material,
wherein the layer of electro-optic material comprises a multi-domain barium titanate crystal with crystalline c axes oriented at an angle of about 45 degrees with respect to the second direction in a plane orthogonal to the first direction.

16. The spatial light modulator of claim 15, wherein each phase shifter in the array of phase shifters is configured to modulate the phase of the corresponding portion of the light independently of an amplitude of the incident light.

17. The spatial light modulator of claim 15, wherein each Fabry-Perot resonator is an asymmetric Fabry-Perot resonator.

18. The spatial light modulator of claim 15, wherein each Fabry-Perot resonator has a loaded quality factor $Q_{tot}$ of $$\left(\frac{\Delta n}{n_0}\frac{U_{BTO}}{U_{tot}} + \frac{2}{Q_{int}}\right)^{-1} \leq Q_{tot} \leq \frac{1-\sqrt{R_0}}{2} Q_{int},$$

where $\Delta n$ is a change in the real part of the refractive index of the layer of electro-optic material, $n_0$ is the refractive index of the layer of electro-optic material without an applied electric field, $(U_{BTO}/U_{tot})$ is a fraction of energy in the layer of electro-optic material, $Q_{int}$ is an intrinsic quality factor of the Fabry-Perot resonator, and $R_0$ is a reflectance on resonance of the Fabry-Perot resonator.

19. A spatial light modulator comprising:
a first reflector having a first reflectivity;
a second reflector having a second reflectivity greater than the first reflectivity and configured, together with the first reflector, to reflect light in a first direction;
a layer of electro-optic material, between the first reflector and the second reflector, to shift a phase of the light incident on the first reflector in the first direction; and
an array of electrodes, in electrical communication with the layer of electro-optic material, to generate electric fields in a second direction orthogonal to the first direction, the electric fields modulating a real part of a refractive index of respective sections of the layer of electro-optic material,
wherein the layer of electro-optic material comprises one of a single-domain barium titanate crystal with a crystalline c axis oriented at an angle of about 40 degrees with respect to the second direction in a plane orthogonal to the first direction or a multi-domain barium titanate crystal with crystalline c axes oriented at an angle of about 45 degrees with respect to the second direction in a plane orthogonal to the first direction.

20. The spatial light modulator of claim 19, further comprising:
a microlens array, in optical communication with the layer of electro-optic material, to confine the incident light laterally within the layer of electro-optic material.

21. The spatial light modulator of claim 19, further comprising:
  at least one defect, in optical communication with the layer of electro-optic material, to confine the incident light laterally within the layer of electro-optic material.

* * * * *